Nov. 21, 1944.  E. L. BIVANS  2,362,967
TIRE GROOVING APPARATUS
Filed March 9, 1942   11 Sheets-Sheet 5
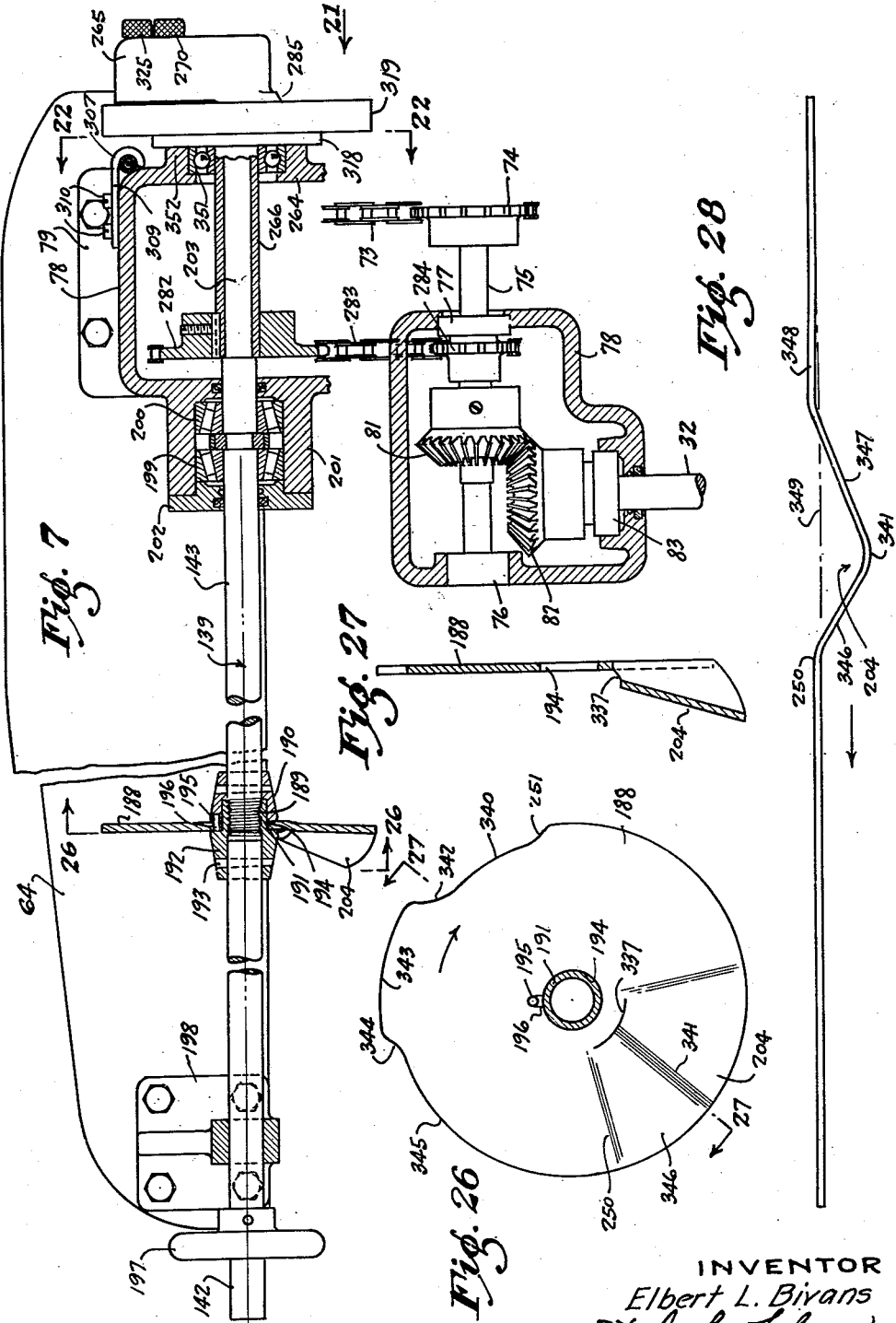
INVENTOR
Elbert L. Bivans
BY John Flam
ATTORNEY

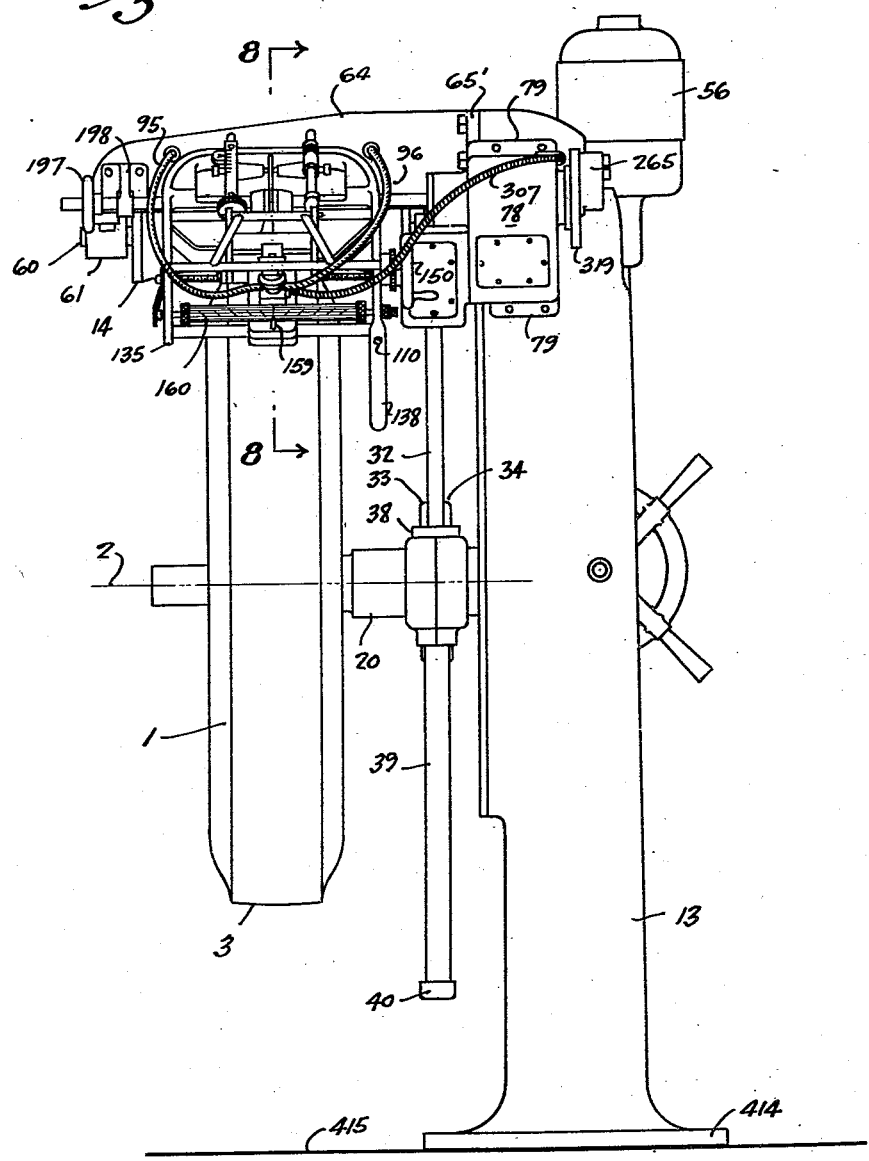

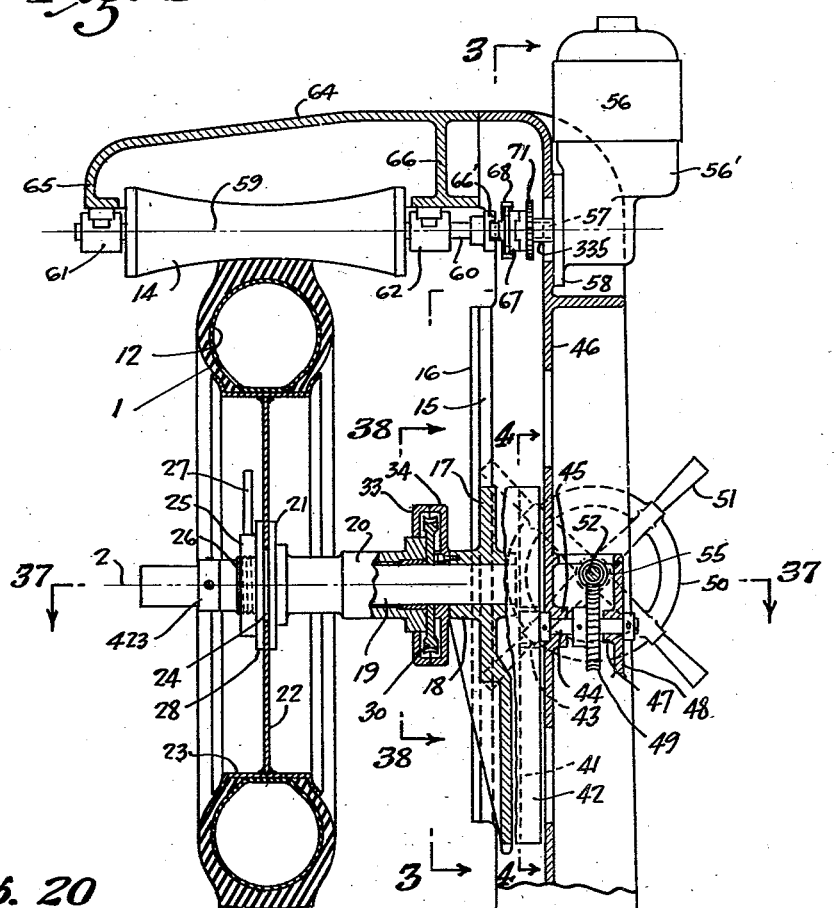
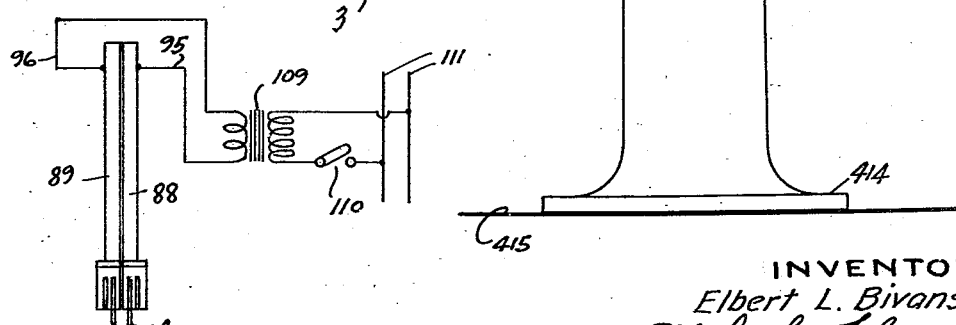

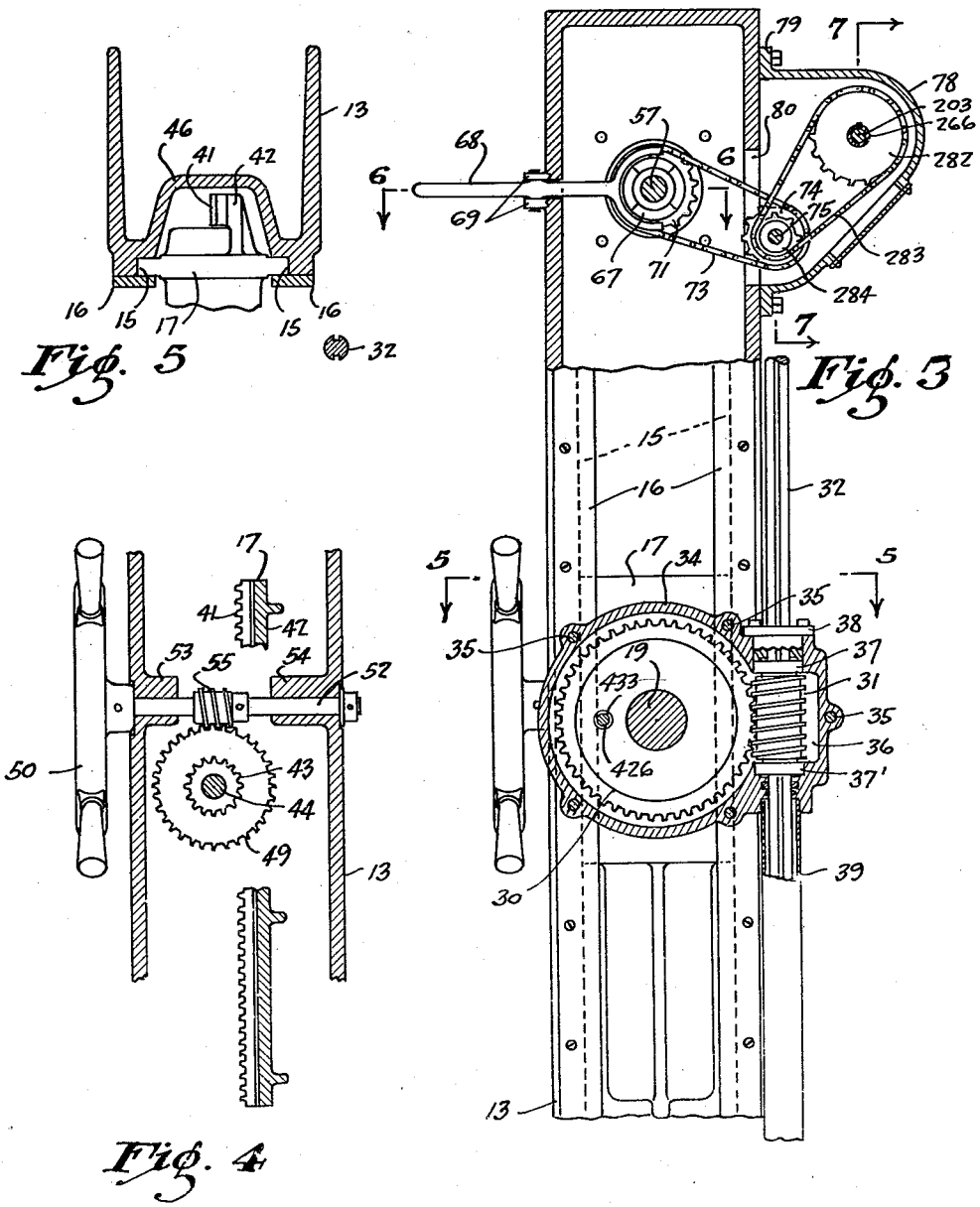

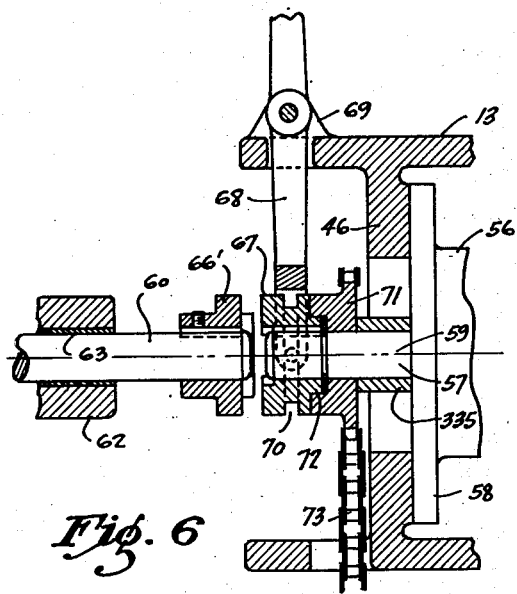
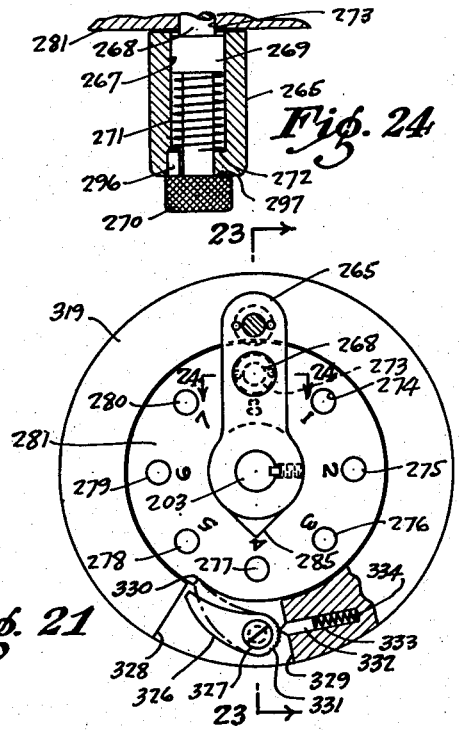
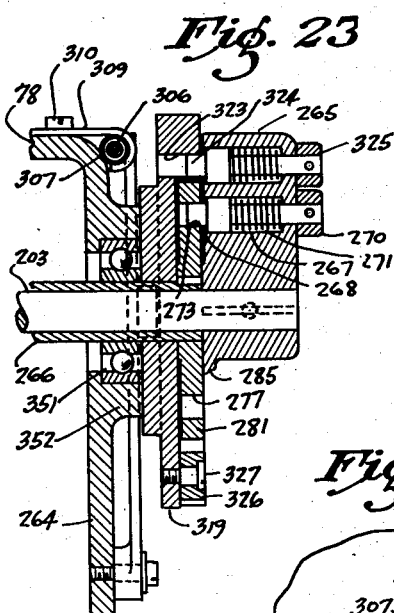
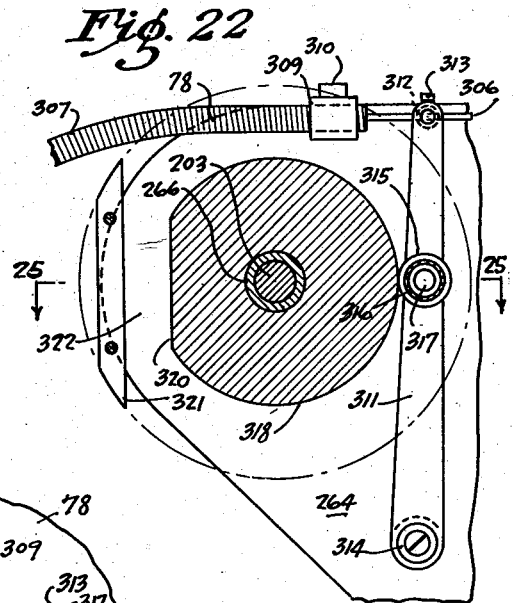

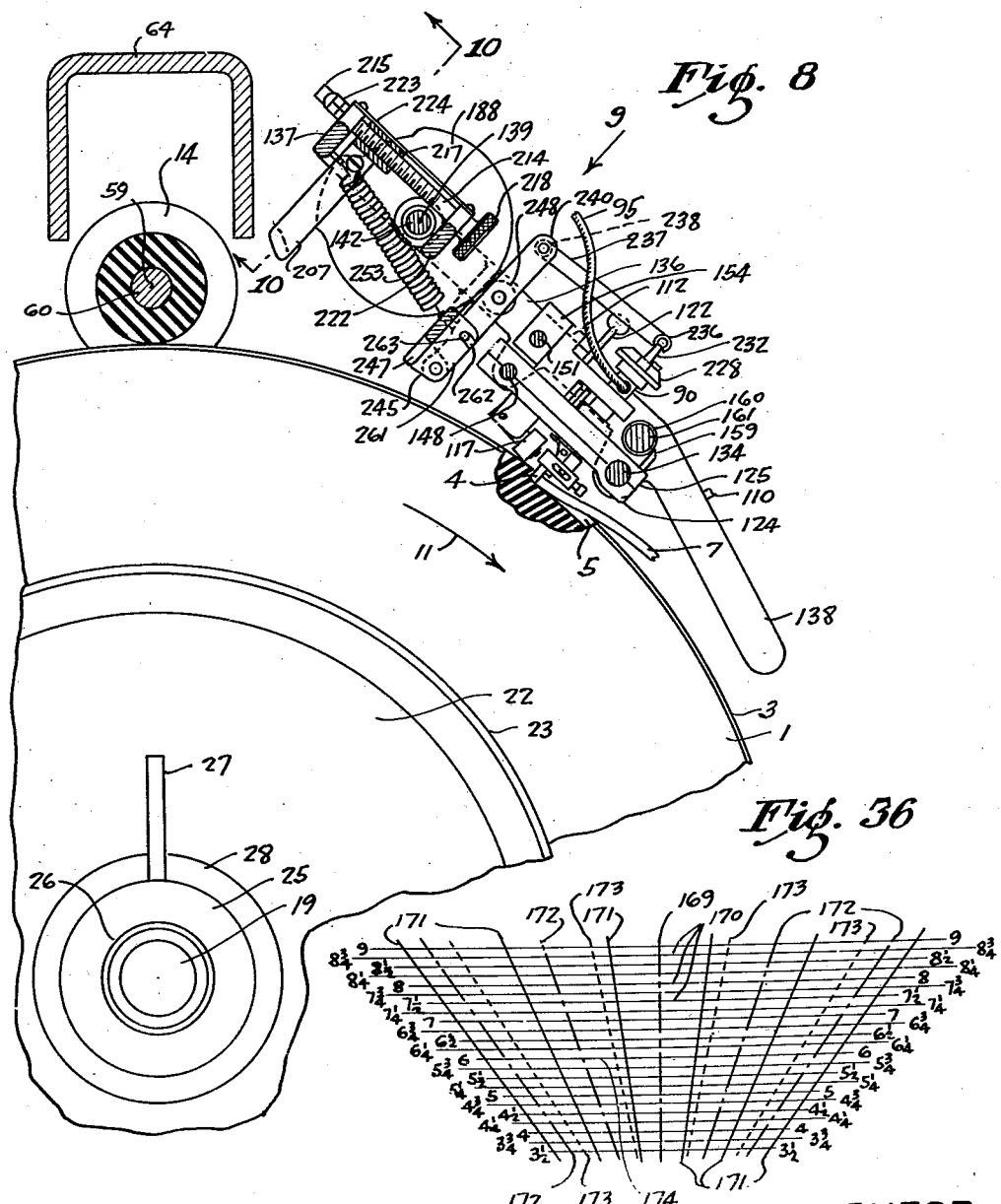

Nov. 21, 1944.   E. L. BIVANS   2,362,967
TIRE GROOVING APPARATUS
Filed March 9, 1942   11 Sheets-Sheet 7
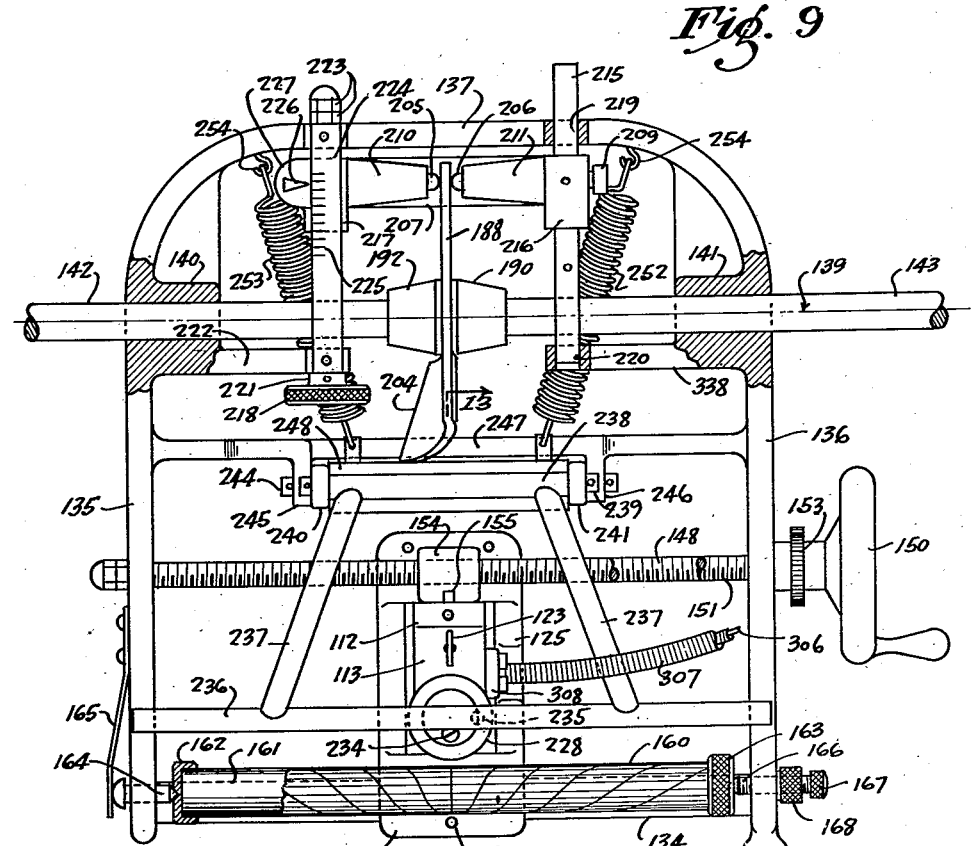
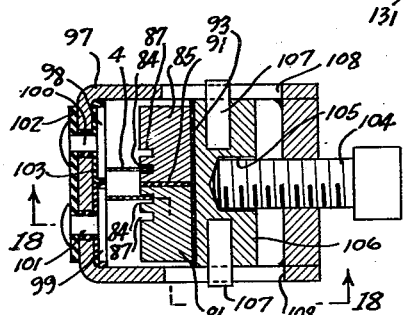
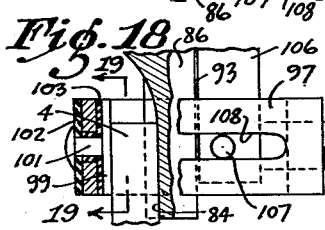
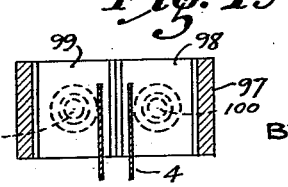
INVENTOR
Elbert L. Bivans
BY John Flann
ATTORNEY

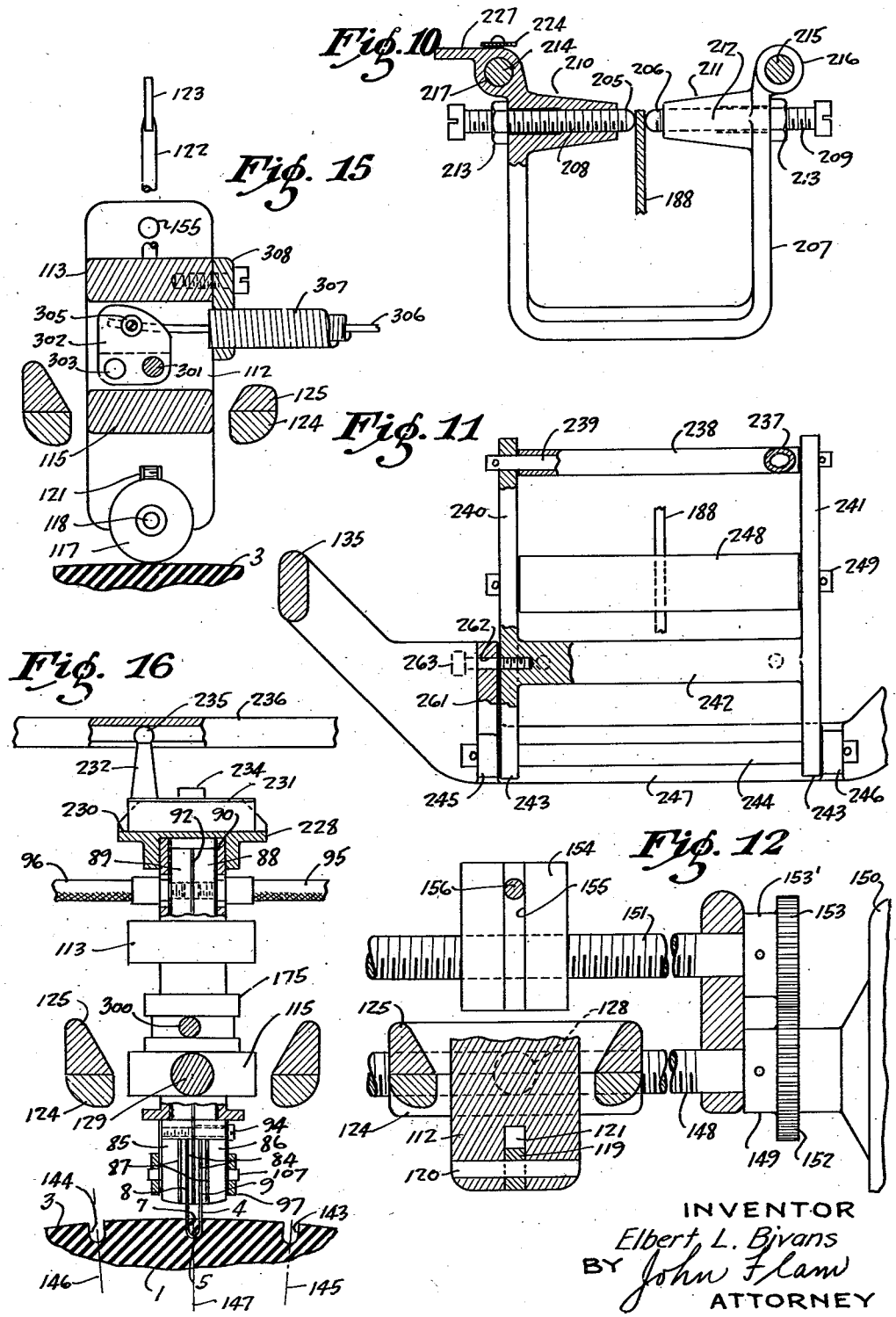

INVENTOR
Elbert L. Bivans
BY John Flam
ATTORNEY

Nov. 21, 1944.   E. L. BIVANS   2,362,967
TIRE GROOVING APPARATUS
Filed March 9, 1942    11 Sheets-Sheet 11
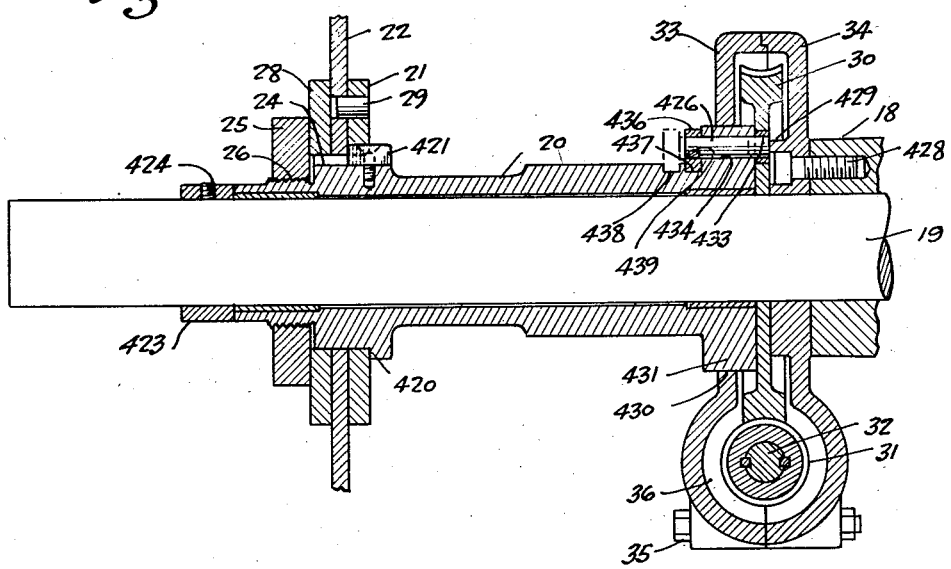
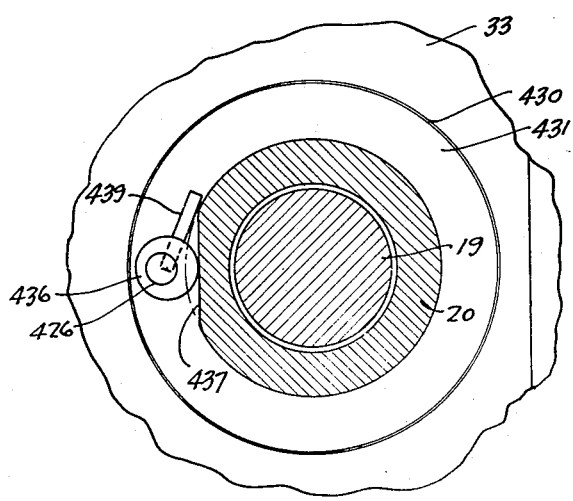
INVENTOR
Elbert L. Bivans
BY John Flam
ATTORNEY Patented Nov. 21, 1944

2,362,967

UNITED STATES PATENT OFFICE 2,362,967

TIRE GROOVING APPARATUS

Elbert Litton Bivans, Los Angeles, Calif., assignor to Arch B. Cleveland, Los Angeles, Calif.

Application March 9, 1942, Serial No. 433,954

12 Claims. (Cl. 82—1)

This invention relates to a tire groover. In one process of forming the tread of a rubber tire, the rubber at the road engaging portion is first in the form of a smooth tread. In the instance where the tire is one that is repaired or recapped, this tread rubber, usually referred to as "camelback" is first adhered to the tire carcass, by the aid of a pressure roller. This step is usually referred to as a "stitcher" process. Then the tire is placed in a mold or chamber for vulcanizing the camelback to the tire, and to cure it. In one such process, the vulcanization is accomplished by the aid of live steam, inert gas or other heat transmitting media, directly in contact with the tire.

Before or after this vulcanization is completed, the grooves are cut to form the tread pattern. The cutter is preferably in the form of a grooving knife, heated as by electricity. This knife is urged in a generally radial direction inwardly of the tread, thus determining the depth of the groove to be cut; at the same time the tire is rotated, so as to cause relative angular motion between the tire and the knife. In the past, it has been common to guide the knife mainly manually. This of necessity introduced undesirable irregularities.

It is one of the objects of this invention to provide an improved groove cutter apparatus operated substantially by machinery, and ensuring that the grooves will conform to the desired pattern.

It is often desired to cut grooves to form a pattern, rather than straight unswerving grooves. For example, V shaped offsets may be desired, at uniformly spaced points along the groove. The apparatus of this invention makes it possible not only to cut such patterns without the necessity of hand guiding, but also to provide a variety of patterns by appropriate adjustment of the apparatus.

In order to accomplish these results, the apparatus incorporates a carriage or head that supports the grooving knife. This carriage is movable in a direction parallel with the axis of the tire, upon appropriate guides. It is another object of this invention to provide a mechanism that will automatically and intermittently move this carriage in that direction simultaneously with the rotation of the tire, to cause the groove to assume a transverse direction.

Several problems occur in connection with the automatic intermittent movement of the groover head. The groover tool that is found to be quite effective is one that is heated by the aid of electric power, and is U-shaped. There is a forward or cutting edge for the tool, corresponding in configuration to the letter U, so that a cutting is secured, defined by the legs and bottom of the U. In performing its cutting operation, this edge must be presented to the work so as to lie in a plane substantially normal to the direction of relative motion between the tool and the work. Accordingly at the beginning of the lateral movement of the carriage in one direction, the tool must be turned to agree with the change of direction of the cut. It is accordingly another object of this invention to make it possible to maintain the position of the groover tool in relation to the direction of the cut, either when the groove is undeviating, or when there are transverse portions or offsets from the groove.

It is still another object of this invention to make it possible to predetermine the size, or position, or the number of such transversely cut portions of the groove.

It is usually desirable to cut a number of grooves in the tread portion of the tire. These grooves are disposed along the width of the tire in a definite spaced relation. It is another object of this invention to make it possible to cut such multiple grooves in succession by appropriate adjustment of the mechanism.

The shape of the tread cross-section, taken along a plane passing through the axis of the tire, is rounded. Now if multiple grooves are to be cut, spaced along this cross section, it is evident that the center line of each of the groove sections should be normal to the tread surface where the groove occurs. This requires that the groover knife be angularly adjusted from one cut to the next. It is another object of this invention to make it possible to effect this adjustment in an automatic manner, as the position of the groover is adjusted for the succeeding grooves.

The groover knife, for this purpose is so mounted with respect to the carriage that the lateral position of the groover may be adjusted with respect to the carriage. It is another object of this invention to provide a simple mechanism that effects the angular adjustment of the groover as this lateral adjustment is made.

It is still another object of this invention to provide a simple and effective manner of heating the groover, and particularly by directly passing a heating current through the groover.

It is sometimes desirable to provide "sub-vents" in the tire grooves. These sub-vents are formed by reducing the depth of the groove for a short angular distance, thus stiffening the walls of the groove. It is another object of this invention to make it possible to produce these sub-vents by a periodic slight lift of the groover as the grooving process proceeds. In this connection, it is still another object of this invention to make it possible optionally to render the sub-vent producing means inactive.

It is still another object of this invention to provide an adjustment for determining the depth of the groove made by the groover.

In a practical embodiment of the apparatus, it is desirable to incorporate the groover in a "stitcher" apparatus. Such a stitcher apparatus usually includes a supporting axle upon which a tire may be mounted for free rotation, and a power driven roller having a concave face, adapted to engage the "camel back" adhesively placed on the tread portion of the tire. As the roller is rotated, the tire is frictionally rotated thereby, and at the same time, the camel back is firmly urged against the annular periphery of the tire carcass. Thus air bubbles are squeezed out.

This process of "stitching" is well-known, and no further explanation thereof is necessary. It is another object of this invention to provide a combination stitcher and groover, so arranged that a common source of power may be utilized optionally for either the stitcher or the groover operation.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a side elevation of an apparatus embodying the invention, and shown as operating upon a tire;

Fig. 2 is a vertical sectional view of the apparatus taken substantially through the axis of the tire being treated;

Fig. 3 is a fragmentary sectional view taken generally along the plane 3—3 of Fig. 2;

Fig. 4 is a sectional view taken along plane 4—4 of Fig. 2;

Fig. 5 is a sectional view taken along plane 5—5 of Fig. 3;

Figs. 6 and 7 are enlarged sectional views taken along correspondingly numbered planes of Fig. 3;

Fig. 8 is an enlarged sectional view taken substantially along plane 8—8 of Fig. 1;

Fig. 9 is a plan view partly in section of a part of the apparatus taken from the direction of the arrow 9 of Fig. 8;

Fig. 10 is an enlarged sectional view taken along the plane 10—10 of Fig. 8;

Figs. 11 and 12 are sectional views taken along correspondingly numbered planes of Fig. 13;

Figs. 14, 15, 16 and 17 are sectional views taken along correspondingly numbered planes of Fig. 13;

Fig. 18 is a sectional view taken along plane 18—18 of Fig. 17;

Fig. 19 is a view taken along the plane 19—19 of Fig. 18;

Fig. 20 is a wiring diagram illustrating the manner in which a heating current is transmitted through the groover knife;

Fig. 21 is a view of a part of the apparatus taken from the direction of the arrow 21 of Fig. 7;

Fig. 22 is a sectional view taken along plane 22—22 of Fig. 7;

Figs. 23 and 24 are sectional views taken along the correspondingly numbered planes of Fig. 21;

Fig. 25 is a sectional view taken along the plane 25—25 of Fig. 22;

Fig. 26 is a sectional view taken along the plane 26—26 of Fig. 7;

Fig. 27 is a sectional view taken along the plane 27—27 of Fig. 26;

Fig. 28 is a diagrammatic development of the carriage shifting cam illustrated in Figs. 26 and 27;

Fig. 36 shows the lines of a chart that may be utilized for facilitating the adjustment of the apparatus; and Figs. 37 and 38 are detail sections as seen on correspondingly numbered planes of Fig. 2.

Figure 13:
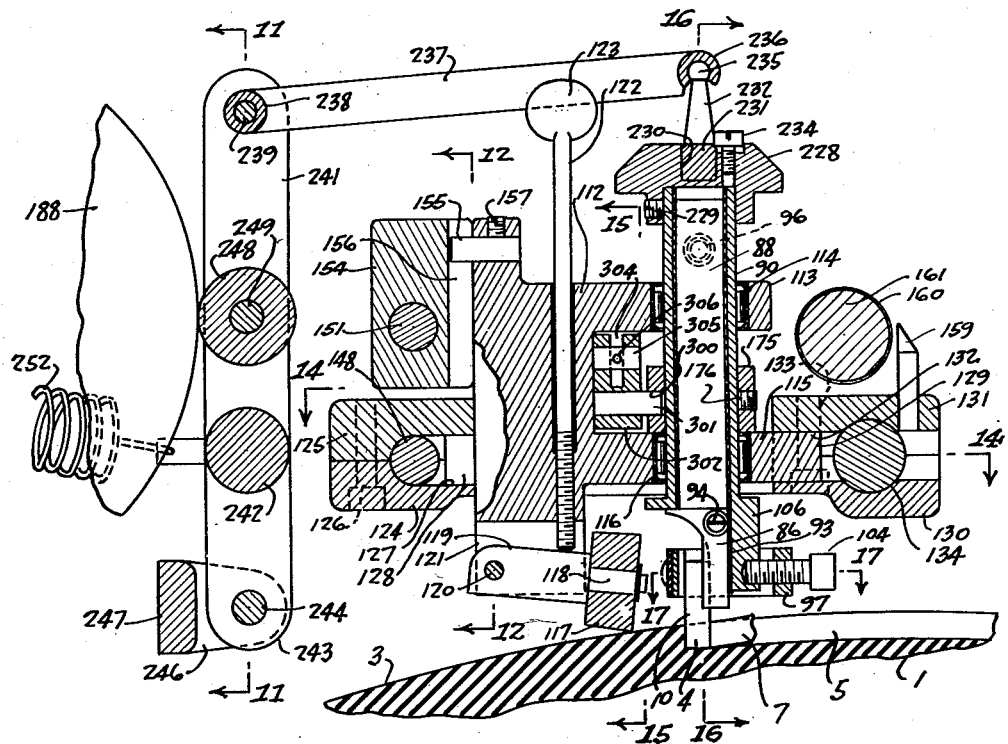
Fig. 13 is a sectional view taken along the plane 13—13 of Fig. 9.

A tire 1 (Figs. 1, 2, 8, 13 and 16) is illustrated as the tire upon which the grooves are being cut by the aid of the apparatus. For this purpose the tire is mounted so as to be driven about an axis 2 (Figs. 1 and 2) shown in this instance as horizontal. As shown most clearly in Figs. 1 and 2, the road engaging surface 3 is shown as prepared for the grooving operation. This road engaging or tread surface 3 may have been formed on the tire as heretofore explained as by vulcanizing a strip of "camel back" on the outer periphery of the tire that had been machined down on its periphery to accommodate the "camel back"; or the tire may be an entirely new carcass, formed with a smooth outer periphery.

As the tire 1 is rotated at a relatively low speed about the axis 2, a groover knife 4 (Figs. 8, 13 and 16) is caused to form the groove 5 by cutting out the strip 7 of the rubber. This strip 7 is shown most clearly in Figs. 8, 13 and 16.

In order to effect this result, the groover knife 4 is shown as of generally U-shape made from metal capable of maintaining a sharp edge. Legs 8 and 9 of the knife extend substantially parallel to each other, and in a direction parallel to the sides of the groove being formed. That edge 10 (Fig. 13) which is presented to the rubber of the tire 1 may be quite sharp. The entire groover knife 4 is arranged to be heated, so as to facilitate the cutting of the rubber to form the strip 7. As shown most clearly in Fig. 8, the groover knife 4 is arranged so that its cutting edge 10 lies in a plane substantially normal to the direction of movement of the tire 1 with respect to the groover knife 4. This movement is in a clockwise direction as viewed in Fig. 8 and as indicated by the arrow 11 thereon.

The cutting of the groove 5 may occur in such a way as to provide a straight groove extending circumferentially in the tread portion of the tire; or as will be hereinafter described, the groover knife 4 may be so controlled as to provide changes in the direction of the knife to form oblique portions or notches in the groove, in accordance with a pre-conceived pattern.

In order to ensure sufficient resistance of the rubber of the tire against deformation while the groover knife 4 is in operation, it is desirable to provide the usual inner tube 12 (Fig. 2) within the tire casing 1, and to inflate it to a sufficient degree to attain this end. Furthermore, as illustrated in Fig. 2, the tire 1 is mounted by the aid of a stationary standard 13 forming the main support for the entire apparatus.

This entire apparatus includes a stitcher mechanism. The stitcher or the groover may optionally be caused to operate upon the work. The stitcher mechanism includes the concave faced stitcher roller 14. This roller has an axis 59 parallel to the tire axis 2. It contacts the peripheral tread portion of the tire; but optionally it may be driven by the aid of a source of motion to effect the stitching operation. During the grooving operation, this roller serves as a rolling abutment with which the periphery of the tire is in frictional engagement. The roller 14 is free to turn by the friction imposed upon it by rotation of the tire 1 about its axis 2. Furthermore, as will be hereinafter explained, the axis 2 of the tire 1 may be adjusted with relation to the machine so as to bring the tire 1 into proper cooperative position with the groover knife 4. This position is determined by movement of the axis 2 vertically downwardly or upwardly until the stitcher roller 14 comes into contact with the outer periphery 3 of the tire 1. In this way, a wide range of tire sizes may be accommodated by the apparatus.

The standard 13, as shown most clearly in Figs. 1, 2, 3, 4 and 5, is shown as a casting extending generally vertically upwardly. The lower portion of the casting is of ribbed construction and may be formed with a foot or base 414 adapted to rest upon the floor 415. In order to provide the means for adjustment of the position of the tire axis 2, the left hand portion of the standard 13 is formed with the vertical guides 15 (Figs. 2, 3 and 5). These vertical guides are shown as cooperating with the guide bars 16 to form vertical grooves within which the edges of a vertically movable slide 17 may be accommodated.

Slide 17 carries an integral hub 18. Within this hub is fixed a stationary shaft 19 (Figs. 2, 3 and 37). This shaft 19 serves as a journal bearing for a sleeve 20, extending toward the left as viewed in Fig. 2. The shaft 19 extends completely through and beyond the tire 1. This tire 1 is removably carried by the rotary sleeve 20, in order to impart rotation to the tire. For this purpose left hand portion of sleeve 20 is provided with a flange 21, which abuts a shoulder 420 formed on sleeve 20 and is prevented from rotating on the sleeve by means of a key 421. Abutting against the left hand surface of this flange 21 is the tire carrying disk 22 having a rim 23 in which the tire is accommodated. This disk 22 is appropriately apertured so as to be accommodated upon the shoulder 24 extending beyond the shoulder 420.

The tire disk 22 is held firmly in place by the aid of the nut 25 threaded on a threaded extension 26 of the sleeve 20. It may be manipulated for example as by the aid of the handle 27. This handle is also shown in Fig. 8. The nut 25 serves to urge a collar or washer 28 against the left hand surface of the disk 22. In order further to ensure against relative angular motion of the sleeve 20 and the disk 22, one or more dowel pins 29 may be attached to the flange 21 and are adapted to engage in corresponding apertures in the disk 22. A collar 423 secured to shaft 19 as by one or more set screws 424 serves to prevent axial movement of sleeve 20 toward the free end of shaft 19.

Rotation of the sleeve 20 and corresponding rotation of tire 1 is accomplished by the aid of a worm wheel 30 which is arranged optionally to drive the sleeve 20 by means of a pin 426 as shown most clearly in Fig. 37. This wheel is engaged by a worm 31 splined on a vertical shaft 32. In this way as the slide 17 is moved vertically, the worm wheel 30 is correspondingly moved and the worm 31 is carried along with the wheel 30. Rotation is imparted to the shaft 32 in a manner to be hereinafter described.

The worm 31 and the wheel 30 are shown as enclosed in a split casing having the halves 33 and 34. This casing 33—34 is supported on hub 18 by means of a plurality of screws 428 passing through a hub 429, formed on the half casing 34, and engaging hub 18. The other half 33 has a large opening 430 which closely encircles a flange 431 formed on the end of sleeve 20. These halves may be appropriately fastened together as by the bolts 35 shown in Fig. 3. Furthermore, the casing 33—34 is provided with a recess 36 for the accommodation of the worm 31. The casing at this place is apertured for the passage of the shaft 32. The lower end of the shaft 32 is shown as protected by a tube 39 (Figs. 1 and 3) threaded into the casing 33—35. The end of tube 39 is closed by a cap 40.

The casing 33—34 may also carry the antifriction bearing structures 37 and 37' disposed on appropriate shoulders formed at the top and bottom of the recess 36. A cover 38 is provided over the top end of the aperture through which the shaft 32 extends.

Gear 30 as clearly shown in Fig. 37 is rotatably supported on shaft 19 and is axially confined between the face of hub 429 and flange 431. Gear 30 is provided with a bushed aperture 433 for accommodating pin 426. Pin 426 is axially slidable in a suitable bore 434 formed in flange 431, the arrangement being such that by appropriate axial positioning of pin 426 it may be caused to engage aperture 433 of gear 30 or to be free thereof, whereby sleeve 20 is locked to gear 30 so as to rotate therewith, or sleeve 20 is free to rotate while gear 30 remains stationary. To maintain pin 426 in chosen position, it is provided with a cam head 436 adapted to engage either of the axially spaced transverse slots 437, 438, formed on sleeve 20. By rotating pin 426 by handle 439, head 436 is freed from slot 437 or 438 and pin 426 may be adjusted axially to engage or disengage opening 433.

When it is desired to drive tire 1 by means of stitcher roller 14 incident to securing the camelback on the tire carcass, it is essential that sleeve 20 be disconnected from gear 30, since if worm 31 is not positively driven by the mechanism to be presently described, gear 30 will be locked, as it is not able to drive the worm 31. To rotate the tire in the proper direction when so driven, an appropriate reversing switch may be provided for the motor 56.

The mechanism for moving the slide 17 vertically may now be described. This is accomplished by a rack and pinion mechanism. The rack 41 (Figs. 2, 4 and 5) is shown as supported upon a rib 42 formed integrally with the slide 17. Engaging this rack is a pinion 43 that is mounted upon a rotatable shaft 44. This shaft 44 as shown most clearly in Fig. 2 is appropriately journaled by the aid of the boss 45 extending toward the right of the vertical web 46 of standard 13. Its right hand end is shown as being journaled in the journal bearing 47 formed integrally with the web 48. This web is integrally joined to the vertical rib 46. Between the two journal bearings is located the worm wheel 49 attached as by a set screw to the shaft 44. Appropriate collars are provided for restraining shaft 44 against axial movement.

Worm wheel 49 may be manually rotated for adjusting the axis 2, as by the aid of a hand wheel 50 provided with the radial handles 51. The worm wheel as shown most clearly in Fig. 4 is attached to a shaft 52 mounted for rotation in the hubs 53 and 54 projecting inwardly from the side ribs of standard 13. This shaft 52 carries the worm 55 that engages the worm wheel 49 for driving it. Appropriate collars on shaft 52 limit axial movement thereof.

Rotation of hand wheel 50 in one or the other direction will cause the worm wheel 49 to move in one or the other direction, thereby also rotating the pinion 43. This pinion 43 in turn engages the rack 41 and the slide 17 is accordingly moved in a vertical direction.

Power for the rotation of the shaft 32 is derived from an electric motor 56 (Figs. 1 and 2). This electric motor is shown in this instance as vertical and as supported adjacent the top of the standard 13. As shown most clearly in Figs. 2 and 6, the motor 56 is provided with an end bell 56' within which is located appropriate gearing so that the motor serves to drive a horizontal shaft 57. The end bell 56' is provided with a flange 58 by the aid of which the motor may be bolted to the web 46 of the standard 13. The axis 59 of shaft 57 coincides with the axis of the stitcher roller 14. Web 46 may be appropriately apertured for the passage of shaft 57 therethrough. Furthermore, a bearing sleeve 335 (Fig. 6) may be provided for the left hand end of shaft 57. Stitcher roller 14 has a shaft 60 adapted to be optionally coupled to the motor shaft 57. The shaft 60 as shown most clearly in Fig. 2 is journaled at each end in the standards 61 and 62. These standards may be appropriately lined with a bearing metal as indicated by the sleeve 63 (Fig. 6).

Both of these standards are fastened to a supplemental frame 64 (Figs. 1, 2, 7 and 8). This supplemental frame has appropriate downwardly directed ribs 65 and 66 providing supporting surfaces for the standards 61 and 62. This supplemental frame 64 (Figs. 1 and 8) has a U-shaped section, the opening being directed downwardly and disposed immediately above the axis 59 of the roller 14. Furthermore, the frame 64 may be provided at its right hand edge with a flange 65' (Fig. 1) by the aid of which this frame 64 may be attached to the upper extremity of the standard 13.

The clutching means between the motor driven shaft 57 and the roller shaft 60 comprises a pair of clutch halves 66' and 67 (Fig. 6). The clutch half 66' is shown as attached to the right hand extremity of the shaft 60. It comprises a collar having recesses and projections on its right hand face. The clutch half 67 is splined for axial movement upon the left hand extremity of the motor driven shaft 57. This half 67 is provided with recesses and projections adapted to interengage with the corresponding recesses and projections carried by the half 66' when the half 67 is moved to the left. A shift fork 68 is utilized for axially moving the clutch half 67 into and out of engagement with the clutch half 66'. For this purpose this shift fork is pivoted between the ears 69 formed integrally with the left hand wall of the frame 13 as viewed in Fig. 3. The handle portion of this shift fork extends horizontally from the standard 13, for convenient manual manipulation. The fork end thereof extends through an appropriate aperture in the standard 13 and is provided with appropriate pins engaging in the groove 70 (Fig. 6) provided in the periphery of the splined clutch half 67.

In the position shown in Figs. 2 and 6, the clutch is disengaged and the roller 14 is not driven. In this position however, a sprocket wheel 71 (Figs. 2, 3 and 6) is coupled to the shaft 57 by interengagement of the clutch 67 with the clutching hub 72 of the wheel 71. This engagement is illustrated most clearly in Fig. 2. Thus by appropriate manipulation of the shift fork 68 either the roller 14 is driven or else the sprocket 71 is driven by shaft 57.

By the aid of sprocket wheel 71 power is transmitted to the vertical shaft 32 that imparts rotation to the tire 1. The manner in which this is accomplished is best illustrated in connection with Figs. 3, 6 and 7.

Sprocket wheel 71 is coupled as by the chain 73 to a driven sprocket wheel 74. This sprocket wheel 74 is mounted upon the right hand end of a horizontal shaft 75. This shaft 75 is shown as journaled by the aid of the bearing structures 76 and 77 disposed on opposite walls of a housing 78. This housing 78 as shown most clearly in Figs. 1 and 3, has flanges 79 overlying an aperture 80 in the right hand wall of the standard 13. These flanges serve as appropriate means for attaching this housing 78 to the standard. The bearings 76 and 77 illustrated in Fig. 7 are located in an extension of the housing, placed to the left of the main portion thereof as seen in Fig. 1. The aperture 80 permits the passage of the sprocket chain 73 into the housing 78.

Upon the shaft 75 and within the housing 78 there is rigidly attached a bevel pinion 81. This bevel pinion 81 is shown as driving a similar bevel pinion 82 attached to the upper end of the shaft 32. A bearing structure 83 is provided within the housing 78 for the upper end of the shaft 32.

As the tire 1 rotates in clockwise direction as indicated in Fig. 8, the groover knife 4 as heretofore stated serves to cut out the strip of rubber 7. For this purpose the groover knife 4 is supported as a part of a groover knife structure, capable of being controlled in position so as to effect the cutting of the groove in the desired directions.

The groover knife structure is shown to best advantage in Figs. 9, 13, 14, 16, 17, 18 and 19. Referring first to Figs. 16, 17, 18 and 19, the right hand edges of the legs of the groover knife are engaged in slots 84 formed vertically in the metallic blocks 85 and 86 respectively. These blocks are shown (Fig. 17) as of substantially rectangular cross section. They may be provided with additional grooves 87 to accommodate a wider groover knife if it is desired to cut a wider groove. Furthermore, these blocks project downwardly and are formed integrally with the half round metallic bars 88 and 89. These half round bars are supported within a sleeve 90 and are carefully insulated from each other. This may be accomplished for example by the layer of insulation 91 between the blocks 85 and 86 (Fig. 17) as well as by the insulation sleeve 92 located between the bars 88 and 89 and the sleeve 90. A transverse strip of insulation 93 (Fig. 14) is interposed between the flat faces of these bars. The bars may be held together by the aid of a transverse screw 94 (Figs. 13 and 16) which is appropriately insulated from both of the bars as well as from the rectangular blocks 85 and 86 thereof. No further fastening means is required for the entire bar assembly is tightly encompassed by the supporting sleeve 90.

Furthermore, the bars 88 and 89 form electrical connections to the opposite legs of the groover knife 4 whereby an electric heating current may be passed directly through this groover knife for heating it. The groover knife 4 is especially designed to have the requisite resistance to effect proper heating thereof. Electrical connections to these bars are indicated in general in Fig. 16 by the conductors 95 and 96. These conductors are provided with threaded ends passing through appropriate transverse apertures in the sleeve 90 and threaded into apertures in the bars 88 and 89. The control of the current through these conductors 95 and 96 is effected manually in a manner to be hereinafter described. These conductors are also indicated in Fig. 1.

In order to clamp the legs of the U-shaped knife 4 tightly into the bottom of the grooves 84, use is made of a clamping device illustrated most clearly in Figs. 17, 18 and 19. A frame 97 is provided embracing the lower portions of the blocks 85 and 86. The left hand wall of this frame carries the metal blocks 98 and 99. These blocks may be formed integrally with the shanks 100 and 101 of rivets passing through the left hand wall of the frame. Appropriate insulation material represented by the insulation members 102 and 103, is provided to insulate completely each of these rivets and blocks 98 so that there be no short circuiting of the current flowing through the knife 4.

The blocks 98 and 99 are adapted to engage the left hand edge of the knife 4 as viewed in Fig. 17 and to urge the knife toward the right to the bottom of the groove 94. In order to effect this clamping arrangement a clamp screw 104 (Figs. 13, 17 and 18) is provided. This screw is threaded into the right hand wall of the frame 97. Its inner end is seated for free rotation in a socket 105. This socket 105 is formed in the right hand side of an extension 106 shown as integral with the supporting sleeve 90. This extension 106 furthermore carries the oppositely directed guide pins 107 adapted to engage the slots 108 on opposite sides of the frame 97. Now as the clamping screw 104 is turned in the appropriate direction, the frame 97 is urged toward the right and the clamping blocks 98 and 99 engage the forward edge of the knife 4 and hold this knife firmly in place.

By the aid of this mechanism the operation of removing and replacing a groover knife is simple. It involves merely a loosening operation of the clamping screw 104 and appropriate removal and replacement of the groover knife 4. This groover knife may of course take any desired form for the purpose desired.

The wiring diagram for this groover knife is illustrated in Fig. 20. The heating current is provided by the aid of the step-down transformer 109. The primary of this transformer may be controlled by the aid of a switch 110 located on an accessible portion of the mechanism as hereinafter described. When the switch 110 is closed, the transformer is energized from the main 111 of a commercial source of electrical energy.

The groover knife structure is arranged to be axially and angularly movable about the axis of sleeve 90. In this way the direction of the cutting edge of the knife may be altered to agree with the direction of the desired diagonal cut in the groove. For this purpose the sleeve 90 within which the bars 88 and 89 are fastened is arranged to be supported by frame structure 112 (Figs. 8, 9, 13 and 14). This frame has an upper arm 113 extending generally horizontally through which the sleeve 90 extends. In this arm is located an appropriate roller bearing structure 114 (Fig. 13) for rotatably supporting the sleeve 90 and for guiding it axially. Spaced below this arm 113 is another arm 115 similarly provided with the roller bearing structure 116.

The manner in which the position of this frame structure may be adjusted in order to adjust the position of the groover knife 4 will be detailed hereinafter. For the present it is sufficient to note that this frame structure is provided with means for limiting its movement under the force of gravity toward the tire 1.

This stopping structure is shown most clearly in Figs. 8, 12, 13 and 15. It comprises a roller 117 of slightly conical form adapted to engage at its forward edge with the periphery of the tire 1 in advance of the groover knife 4. The roller 117 is mounted for free rotation about a pin 118 formed integrally with an arm 119. This arm is pivoted about a transverse shaft 120 (Figs. 12 and 13) which extends through the bottom of the frame structure 112 and across a slot 121 disposed therein. An adjusting screw 122 (Figs. 8, 13 and 14) is engaged in a threaded aperture in the lower portion of the frame 112 and immediately above the arm 119. This screw may be provided with a thumb wing 123 for facilitating manual adjustment of the screw 122. The lower end of the screw provides a stop for the upper side of the lever 119. Gravity acts upon the frame structure 112 to bring the contacting edge of the roller 117 into position on tire 1. As the screw 122 is turned, the frame structure 112 is correspondingly raised or lowered with respect to the tire 1. Accordingly the depth of the cut produced by the groover knife 4 is determined.

The axis of rotation of groove limiting roller 117 is made transverse to the axis of rotation of the tire 1. In this way lateral movement of the frame structure 112 during the process of adjustment of this frame structure 112 along the tread portion of the tire is not hindered, the roller 117 rolling over the contiguous surface of the tire 1.

A movable support is provided for the frame structure 112. This movable support is made in such a manner that the frame 112 can be given a motion transverse of the tire face for adjusting the transverse position of the groover knife 4. As shown most clearly in Figs. 8, 9, 12, 13, 14, 15 and 16, this frame structure includes a lower half 124 and an upper half 125. These halves are clamped together by appropriate bolts 126 (Figs. 13 and 14) passing through the left hand portions of these frame members. At this left hand portion the two halves 125 and 126 provide a cylindrical bearing aperture 127 for the accommodation of the stub shaft 128 formed integrally with the frame 112.

Figure 14:
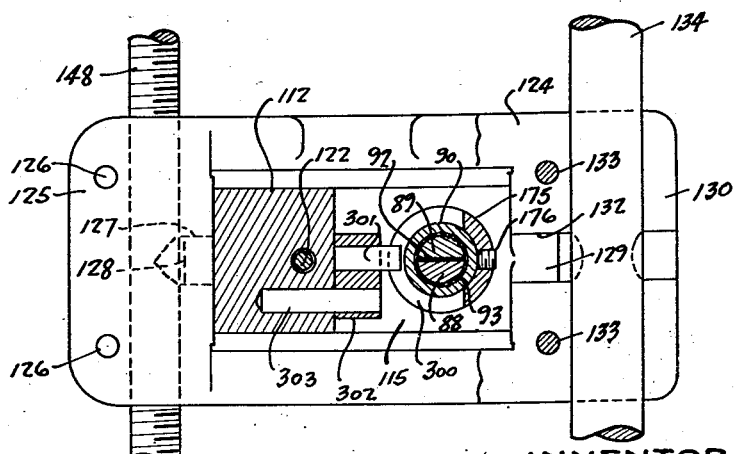

At the forward end of the lower arm 115 of the frame 112 there is provided a similar coaxial stub shaft 129 integrally formed with the arm 115. The bearing aperture 132 for this stub shaft 129 is formed partly in the forwardly extending portion 130 of the lower half 124. The upper portion of the bearing aperture 132 is formed by an extension 131 formed on the upper half 125. Extensions 130 and 131 are attached together as by the aid of the bolts 133 (Figs. 13 and 14). These portions 130 and 131 embrace a guide rod 134 supported in a carriage, the structure of which will be hereinafter described. The parts 130 and 131 are so arranged that these parts are free to slide upon the transverse guide rod 134. The rear surface of support 112 is placed close to the contiguous surface of the frame 124—125.

The carriage which supports the guide rod 134 and which thereby supports the groover knife structure for transverse motion, is illustrated to best advantage in Figs. 9 and 11. It includes a frame having the side arms 135 and 136 together with a transverse integral wall 137. It is between the forward ends of these arms 135 and 136 that the guide rod 134 is located. The arm 136 may be provided with an extension 138 serving as a handle for the carriage. The switch 110 for controlling the energization of the transformer 109 (Fig. 20) may be conveniently located so that its controlling button extends outwardly of this handle.

The entire carriage is arranged to be pivoted upon an axis 139 transverse to the tread of the tire 1 and parallel to the axis of the tire 1. This pivot support is provided by the aid of the integrally formed bosses 140 and 141 respectively on the inner sides of the arms 135 and 136. These bosses coact with the shaft sections 142 and 143 which serve other purposes to be hereinafter described. It is sufficient for the present to note that the carriage structure 135—136 is permitted pivotal movement about the axis 139. The force of gravity tends to rotate the carriage 135—136 in a clockwise direction so as to bring the limiting roller 117 into contact with the tire 1.

When the support 124—125 is substantially central of the carriage as viewed in Fig. 9, the groover knife 4 is arranged to cut a groove at the very crown of the tread of the tire 1. In order to cut additional grooves to the right or left of the crown, the groover knife structure is arranged to be moved laterally of the carriage 135—136. This lateral movement, however, must be accompanied by movement such that the axis of the sleeve 90, and therefore the cutting edge of the knife 4, stays substantially normal to the curvature of the tread portion. This is exemplified for example in Fig. 16 where the central groove is shown as being cut. On each side thereof are illustrated the grooves 143 and 144. The center lines 145 and 146 of these grooves converge to a common point along the main center line 147 of the tire 1. Accordingly lateral movement to the right or left as viewed in Fig. 16 of the sleeve 90 with its groover knife structure is accompanied by a tilting movement of the sleeve 90 about the axis of the stub shafts 128 and 129. The manner in which this compound movement is effected will now be described. For this purpose reference may be had more particularly to Figs. 9, 12, 13 and 14.

A lead screw 148 having an axis parallel to the axis of the guide rod 134 but spaced therefrom is threaded into the two halves 125 and 124. As shown most clearly in Fig. 13, the axis of this lead screw intersects the axis of stub shafts 128, 129 affixed to frame 112. Rotation of this lead screw causes lateral movement of the supporting frame 124—125. The lead screw is provided with a bearing in each arm 135 and 136. It is also provided with a collar 149 attached to a hand wheel 150 (Figs. 9 and 12). This collar, together with appropriate nuts engaging the left hand end of screw 148, restrain axial movement thereof.

The hand wheel 150 is arranged to operate another lead screw 151, spaced immediately above the lead screw 148. This is accomplished by the aid of the gears 152 and 153 (Fig. 12). Gear 152 is shown as supported on the collar 149; gear 153 meshing therewith is shown as supported on a collar 153' joined to the right hand extremity of the lead screw 151. This lead screw 151 is engaged in a traveling nut 154, immediately back of frame 112. Lead screw 151 is restrained against axial movement in a manner similar to the restraint of lead screw 148.

Nut 154 is provided with a transverse groove 155 serving as a guide for a pin 156. This pin 156 is attached to the upper portion of the groover knife supporting frame 112 as by the aid of the set screw 157. If the nut 154 were to travel in step with the support 124—125, there would be no tilting motion of the support 112 about the axis of stub shafts 128 and 129. Now considering Fig. 12, and assuming that the frame 112 is in the central position of Figs. 9 and 16, then if the support 124—125 be moved toward the right from the central position, the nut 154 must be moved still further to the right in order to cause proper tilting direction of the frame 112 about the stub shafts 128, 129. Similarly, if from the central position of Fig. 12 the support 124—125 be moved toward the left, then the nut 154 must be moved at a faster rate toward the left so as to provide the opposite inclination to the axis.

This result is accomplished by appropriate choice of gears 152 and 153 and appropriate choice of the thread pitch on the lead screws 148 and 151. Furthermore, if lead screw 148 carries a right hand thread, obviously the lead screw 151 should be left handed because of the reversal of the direction of rotation through the gears 152 and 153. Gear 153 should have fewer teeth than gear 152 so that the lead screw 151 is rotated at a slightly faster rate than screw 148. Since gears 152 and 153 have small diameters, their teeth are necessarily relatively few, therefore for obtaining a finer differential movement, the pitches of the threads of the two lead screws 148 and 151 differ slightly.

For example, in one embodiment, the gear 152 has thirty-six teeth and the gear 153 has thirty teeth. Similarly, the lead screw 148 is of thirteen pitch and lead screw 151 has fourteen pitch. For the values given, one revolution of screw 148 causes the advance of the stub shafts 128, 129, of one-thirteenth of an inch, or .0769 inch. The corresponding advance of pin 156 is $\frac{1}{14} \times \frac{36}{30}$ or .0857 inch, a differential of .0088 inch for each revolution of the lead screw 148. The angular displacement of the frame 112 is determined by the differential as well as by the distance between the axis of shafts 128, 129 and the axis of pin 156.

The ultimate angular displacement may be predetermined by appropriate choice of this spacing, as well as of the number of teeth in the gears and the pitch of the threads.

Provisions are made to facilitate adjustment of the tire groover structure by the aid of the hand wheel 150, in accordance with the requirements of different widths of treads and the particular number of grooves to be cut. For this purpose an indicator point 159 (Figs. 8, 9 and 13) is fastened into the top member 131 so as to be carried along with the supporting frame 112. This pointer is arranged to cooperate with a chart 160 mounted upon a rotatable drum 161. The axis of this drum is parallel with the axis 139 of the carriage 135—136. This drum as shown most clearly in Figs. 9 and 13 is provided with the end caps 162 and 163. Each of these caps 162 and 163 are telescoped over the chart 160 and are each provided with tapered recesses for the accommodation of taper trunnions. The left hand trunnion 164 is slidably mounted in the arm 135 and is held resiliently against the head 162 by the aid of the leaf spring 165. The right hand trunnion 166 is in the form of a screw threaded through the arm 136, and having a knurled head 167. A knurled check nut 168 may be provided to maintain this trunnion screw 166 in any desired adjustment.

The markings upon the chart 160 is illustrated in Fig. 36, which shows the lines upon the circular chart, in developed position. This chart has a center line 169 corresponding to the central position of the groover knife structure as illustrated in Figs. 12 and 16. The drum structure 161—162—163 is made axially adjustable by aid of screw 167 in order to make it possible for this center line 169 to correspond accurately with the crown or crest of the tire 1.

The drum 161 that carries chart 160 may be manually rotated by the aid of the knurled head or cap 163. By the aid of this rotation it is possible to choose any geometric element of the cylinder into which the chart 160 is formed, for cooperation with index 159. Specific cylindrical elements are marked by the horizontal lines 170 in Fig. 36. Each of the horizontal lines corresponds respectively to a width of the tread over which the grooving is to extend. The uppermost line 170 for example corresponds to a tread width of nine inches. The lowermost one corresponds to a tread width of three and one-half inches. Furthermore, these horizontal lines are intersected by several series of sloping lines. One such series is represented by the full lines 171. This may be of a specific color, for example red, and correspond to the requirement to cut six grooves in the tire face. This requirement is satisfied by the fact that there are six such sloping lines in the series 170. Other sloping lines illustrated by the dash lines 169 and 172 may correspond to the cutting of five grooves in the tire face. These lines may also have a distinctive color, such as black. The dotted lines 173 correspond to four grooves, and may be of a distinctive color such as green.

Assuming for example that the tire width is six inches and it is required to cut five grooves therein, the drum 161 is rotated until that element 174 corresponding to six inch width is immediately adjacent the pointer or index 159. The requirement that there be five grooves cut necessitates a central groove, the pointer 159 starting upon the center line 169 for the first groove. After this groove is cut the carriage structure 135—136 can be rotated out of contact with the tire 1, and the hand wheel 150 may be rotated in either one or the other direction to bring the pointer at those places on element 174 where one of the dash lines 172 intersects the horizontal line 174. The groove can then be cut after this adjustment by permitting the carriage 135—136 to move down to the active position illustrated. Succeeding grooves are cut in a similar manner, the hand wheel 150 being rotated to bring the index 159 to the point where the chosen element line 174 intersects the chosen sloping line 172. Thus by proper inclinations of all of the lines 171, 172, 173, the required spacing of the grooves for various tread widths can be accurately represented by the corresponding points of intersection of the lines with the cylinder elements 170.

In the operation of the apparatus, the handle 138 (Fig. 8) is brought downwardly to cause contact between the guide roller 117 and the rotating tire 1. The switch 110 is operated to closed position. As the tire 1 rotates in a clockwise direction, the groove is cut in the manner hereinbefore described. The force of cutting operating as a reaction upon knife 4 causes the sleeve 90 (Fig. 13) to be urged downwardly until the stop collar 175 contacts with the upper surface of the arm 115. This stop collar 175 as shown most clearly in Figs. 13 and 14 is held in appropriate position upon the sleeve 90 by aid of the set screw 176. It has another function which will be described hereinafter.

It has been assumed that the carriage 135—136 is manually held against axial movement on its guide shafts 142 and 143. This is the condition required when simply straight grooves are being cut. However, if there are to be transverse portions in the groove cut this is performed by mechanical oscillation of the entire carriage 135—136 axially with respect to the axis 129. This shifting occurs an integral number of times during one complete revolution of the tire 1. These transverse cuts may be in the form of diagonal lines which provide notches or other patterns in the grooves cut.

Figure 29:
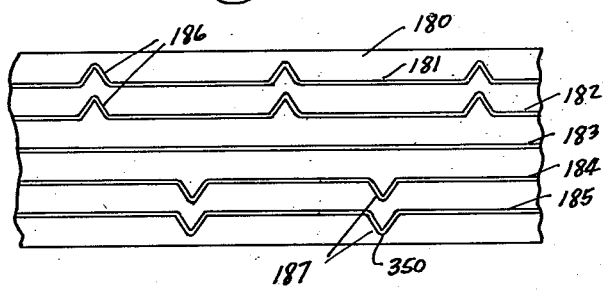
Figs. 29, 30 and 31 are fragmentary developments of various tire tread grooves that may be cut or formed by the aid of the apparatus.

A typical tire tread pattern cut by this means is illustrated in Fig. 29. In this case the tread portion 180 of the tire is shown as grooved with five grooves 181, 182, 183, 184 and 185. The central groove 183 is straight. The two side grooves 181 and 182 have transverse portions 186 forming notches. In the other two side grooves 184 and 185, notches 187 are formed pointed in the opposite direction from the notches 185.

All of these notches are formed by appropriate timed or cyclic reciprocation or oscillation of the carriage 135—136.

For this purpose the carriage 135—136 is moved in this axial manner by the aid of a cam 188 (Figs. 7, 9, 26 and 27), formed of thin metal, and supported by the shaft sections 142, 143. Thus, the cam is rotated on the axis 139, by rotation of these shaft sections. Furthermore, the arrangement is such that the cam may be removed and new cams substituted to form either a different pattern for the groove, or a pattern of the opposite hand.

Shaft sections 142, 143 are driven in synchronism with the tire supporting sleeve 20 (Fig. 2). The ratio of the rotation of shafts 142, 143 and of the rotation of tire 1 is made an even integer by appropriate choice of the gearing. Furthermore, this integral ratio may be varied by changing the gear ratios. Under any circumstances the angular spacing between the notches in the grooves is independent of the tire diameter, for this spacing is dependent solely upon this integral ratio. This ratio in most instances may be from fifteen to twenty-four, corresponding to the number of equidistant notches formed in each groove.

The manner in which this integral ratio drive is accomplished will be described hereinafter. At this time the manner in which the cam 188 is supported upon the shaft sections 142 and 143 for ready detachability will be described.

The left hand end of shaft 143 has a threaded extremity 189 (Fig. 7). It also carries a socket member 190 firmly attached to the shaft. Into this socket member is adapted to telescope the hollow sleeve 191 that is internally threaded to engage the threaded portion 189. This sleeve 191 is formed integral with a hub 192 attached as by the aid of the taper pin 193 to the shaft section 142. The cam 188 is provided with a central aperture 194 through which the sleeve 191 extends. Thus the cam is held between the contiguous faces of the members 189 and 192. Furthermore, in order to prevent any angular rotation between the shaft 143 and the cam 189, the socket member 190 may be provided with a pin 195 adapted to engage in the slot 196 opening into the aperture 194.

In order to remove or replace the cam 188 therefore, the hand knob 197 (Figs. 1 and 7) attached to shaft section 142 may be rotated to disengage the threaded parts 191 and 189. The shaft section 142 may then be moved axially to release the cam 188. A reverse operation may be provided for replacement of the cam 188 in an obvious manner.

The shaft section 142 is shown as journaled in a standard 198 (Figs. 1 and 7). This standard may be attached in an appropriate manner to one wall of the supplemental frame 64.

The shaft section 143 may be rotatably supported by the roller thrust bearing structures 199 and 200 (Fig. 7). These thrust bearing structures have outer races supported in the bearing hub 201 projecting from the left of the housing 78 and formed integrally therewith. A collar 202 may be attached to the left hand end of the hub 201 to maintain the bearing structure 199 and 200 in proper axial position within the hub.

Shaft section 143 has an extension 203 passing through the casing member 78, and is adapted to be driven by transmission mechanism to be hereinafter described.

In the present instance, the cam 188 is shown as provided with a raised crown portion 204 (Figs. 9, 26 and 27). The carriage 135—136 is provided with cam follower members 205 and 206 contacting opposite sides of the cam, as shown most clearly in Figs. 9 and 10. Accordingly as the raised crown portion 204 passes between the cam followers 205 and 206 the entire carriage 135—136 moves toward the left, and then moves to the right, back to the central position.

For the accommodation of the cam followers 205 and 206, the carriage 135—136 carries a U-shaped support 207 (Figs. 8, 9 and 10). The cam followers 205 and 206 are shown as being the rounded ends of the screws 208 and 209 engaging the threads within the bosses 210 and 211. These bosses project inwardly from the sides of the frame 207. These cam followers are mounted on a common axis 212 parallel with, but spaced from the axis 139 of the cam 188. Furthermore, as is apparent from Fig. 27, the crown portion 204 is so formed as to be in accurate contact with both of the followers when this crown portion moves angularly between them; that is, the thickness of the cam measured in the direction of the follower axis 212 is just sufficient to be in engagement with the cam follower points 205, 206. The screws 208 and 209 are axially adjustable within the bosses 210 and 211 so that they may be set accurately with relation to the cam. Furthermore, they may be held in adjusted position as by aid of the check nuts 213.

The crown portion 204 of the cam thus urges the U-shaped frame 207 toward the left and toward the right in accordance with the configuration of this crown portion. As shown most clearly in Fig. 27, this crown portion 204 is so arranged that the amount of lateral movement of the carriage 135—136 is dependent upon the distance of the axis 212 of the followers from the axis 139 of the cam. Accordingly this crown portion converges toward the cam axis, as shown in Fig. 27. Most conveniently the cam may be formed from a flat plate, curved to define the crown 204. To facilitate bending the plate, it may be split at the inner boundary of the crown, as indicated at 337 (Figs. 26, 27). In this way, formation of the crown out of the main plane of the cam normal to its axis is facilitated.

Provisions are made to adjust the spacing of the axis 212 with relation to the axis 139 so as to predetermine the depth of the notches 186 and 187 (Fig. 29).

For this purpose the frame 207 is not rigidly attached to the frame 135—136. Instead, this frame is adjustably mounted on carriage 135—136. The right hand leg of frame 207 carries a boss 216 at its upper end, into which is fixed a guiding rod 215 having an axis at right angles to the axis of the cam 188, and disposed above this axis 139.

The guide rod 215 is guided in appropriate apertures 219 and 220 (Fig. 9). Aperture 219 is formed in a boss on the rear wall 137 of the carriage, and aperture 220 is formed in the integral extension 338 of boss 141. The left hand leg of frame 207 is similarly provided with a hub 217, which has an internal thread, engaged by an adjusting or lead screw 214. This screw 214 is provided with a knurled head 218 (Fig. 9). The head 218 has an integral collar 221 for restraining the screw 214 from axial movement. This screw is journaled at one end in the arm 222 formed integrally with the boss 140 of the carriage 135—136. The other end of the screw 214 is similarly journaled in the rear wall 137 of the carriage 136—137. It is further restrained against axial movement by the aid of the nuts 223.

By rotation of the knurled handle 218 the U-shaped frame 207 may be adjusted to bring the axis of the cam followers toward and away from the axis 139 of the cam 188. If desired a scale and pointer may be provided to indicate the corresponding depth of the V-notches cut to correspond with the particular setting of the frame 207. For this purpose a scale plate 224 (Figs. 8, 9 and 10) is supported upon the carriage 135—136 and provided with index marks 225 at its left hand edge. Cooperating with these index marks is a pointer 226 marked upon the lateral extension 227 of the hub 217.

The diagonal cuts forming the V-shaped notches 186 and 187 (Fig. 29) correspond in direction to the resultant of two component motions. One of these component motions is the lateral movement of the carriage 135—136. The other motion is that of rotation of the tire 1. The direction of the diagonal portions of the groove is thus dependent upon the relative speeds of these two components.

In order that the groover knife 4 perform its cutting operation in the diagonal directions corresponding to the notches, the plane of the cutting edge 10 (Fig. 13) of this groover knife must be adjusted so as to be substantially normal to the resultant relative direction of the knife structure and the tire. Accordingly provisions are made for rotating the sleeve 90 that carries the groover knife 4 in synchronism with the changes in direction of the cut.

For this purpose the sleeve 90 carries at its upper extremity a collar 228 (Figs. 8, 9, 13 and 16). This collar has a depending flange providing a threaded aperture for the set screw 229 by the aid of which the collar may be attached to the sleeve 90. A groove 230 is formed transversely of the head of the collar. Within this groove is provided a slide 231 carrying a crank pin 232. The eccentricity of the crank pin 232 with relation to the axis of the sleeve 90 may be adjusted by movement of the slide 231 in the slot 230. The slide may be kept in adjusted position by the aid of the clamp screw 234. The active end of the crank pin 232 is formed as a ball 235. By imparting an appropriate force upon the ball end 235, the sleeve 90 is given an angular motion to adjust the cutting edge 10 of the groover so that the edge 10 is in proper agreement with the angle of the notch or other pattern of the groove being cut. Or the eccentricity of crank pin 232 may be predetermined and the adjustable slide 231 omitted, the cam followers 205, 206 being adjusted in accordance with the circumference of the tire to properly synchronize the two motions imparted to the knife and ensure that the knife angle agrees with the angle of the groove of the pattern.

This turning force is accomplished by the aid of a transverse channel shaped member 236. The inner surface of this channel member 236 is shaped to conform to the ball 235. It extends transversely across the carriage 135—136 so that the channel shaped member may be in operative relation with the ball 235 irrespective of the adjusted position of the knife structure supporting frame 112 laterally of the carriage.

The channel member 236 is provided with the integral arms 237 joined to a long sleeve 238. This sleeve 238 is arranged so that it may be moved from left to right as viewed in Fig. 13, thereby imparting a cyclic angular motion to the sleeve 90 about its axis.

For this purpose the sleeve 238 as shown most clearly in Figs. 9, 11 and 13 is mounted for free rotation on a cylindrical rod 239. This rod 239 is mounted adjacent the upper end of the spaced arms 240 and 241. These arms are integrally joined as by the cross piece 242. At the lower ends of these arms 240 and 241 are located ears 243 pivotally mounted upon a shaft 244. This shaft is supported on the carriage 135—136 as by the aid of the ears 245—246 formed integrally with the cross bar 247 joining the sides 135 and 136.

Angular motion of the frame including the side arms 240, 241, about shaft 244 is accomplished by the periphery of the cam 188, which cooperates with a cam follower roller 248. This cam follower roller as shown most clearly in Figs. 11 and 13, is mounted for free rotation between the arms 240 and 241 upon the shaft 249 supported by the arms 240, 241.

The cam configuration to effect rotation of the groover knife structure is shown to best advantage in Figs. 8, 26, 27 and 28. As viewed in Figs. 8 and 27, the cam 188 rotates in a clockwise direction. When the leading edge 250 of the crown portion 204 reaches the followers 205, 206 (Fig. 10), the slope 251 of the radial cam portion arrives at the roller 248 (Fig. 13). The roller dips into the low portion 340 upon continued rotation of the cam, causing the knife structure to be rotated in a counterclockwise direction as viewed in Fig. 9. At the same time, the crown portion 204 moves the carriage toward the right.

At this stage of operation, the right hand portion of a notch 187 (Fig. 29) is being cut. At the time that the crest 341 of the crown portion 204 becomes active, the direction of the knife structure must again be changed to cut the left hand portion of notch 187. The roller 248 is now riding upon slope 342 to the high part 343. When the roller reaches this high part, the knife structure has been rotated in a clockwise direction sufficiently to be properly positioned to cut the left hand portion of notch 187. This cutting continues until the crown portion 204 leaves its followers, when the roller 248 drops down along slope 344 to the inactive portion of the cam. In this position, the knife structure is in the straight ahead direction of Fig. 9.

The roller 248 is maintained in contact with the external periphery of the cam 188 by the aid of a pair of tension springs 252 and 253. These tension springs are anchored to the cross bar 242 at one end and are anchored as by the hooks 254 to the rear wall 137 of the carriage 135—136.

The change of direction of the cutting edge 10 of the groover knife is quite abrupt at the tips of the notches 187 and at the bases of the notches. There is a corresponding resistance to the turning of this structure by the rubber being cut. Accordingly the initiation of the knife structure turning forces and the rate of rotation are designed to occur in such timed relation as to compensate for the reaction of the rubber on the knife structure. The exact configuration of the sloping portions 251, 342, 344, as well as their exact angular relations, are achieved by a process of trial and error.

Similar considerations apply to the exact configuration of the crown portion 204. Here again the resistance or reaction of the rubber against transverse motion of the knife structure must be overcome by appropriate configuration of the cam portions.

The cam development of Fig. 28 illustrates this clearly. This development is taken along a cylinder coinciding with the circular portion 345 of the cam, which is intermediate the high portion 343 and the low portion 340. For clockwise cam rotation, the crown portion 204 advances toward the left. As the rubber is cut along the right hand portion of notch 187 (Fig. 29), the portion 346 between points 250 and the crest 341 is active (Fig. 28). The slope of this portion is made sufficiently abrupt to compensate for the reaction of the rubber against the left hand side of the knife structure as viewed in Fig. 9.

Now after the turn in direction of the cut is made at the crest 341, the sloping portion 347 is active. The slope of this portion is, by trial and error, less than that of portion 346, due to the different direction of the reaction of the rubber against the knife structure. This sloping portion 347, it has been found, must be carried somewhat beyond the main plane 349 of the cam, in order to form the point 350 (Fig. 29) of notch 187 in alinement with the main portion of the groove. The portion 348 of the crown cam is a gently sloping part, restoring the knife structure to the straight position of Fig. 9, and acting to compensate for the rubber reaction when the initial straight portion beyond point 350 is cut.

For cutting the notches 186 in the opposite direction, a left-hand cam of similar configuration to cam 188 is substituted.

In the event that only straight grooves are to be cut, without any lateral or transverse portions, shaft 142—143 is disengaged from the driving mechanism by an arrangement to be presently described and the cam 188 is turned to a neutral position, that is, one in which carriage 135—136 is positioned midway between the limits of its lateral movement, and in which the knife structure is placed in its straight position.

Furthermore, means are provided to positively maintain the knife structure in this straight position. Thus the springs 252 and 253 operate to bring the pivoted cam follower structure illustrated in Fig. 11 to definite position. For this purpose, the ear 245 (Figs. 8 and 11) carried by the arm 136 of the carriage, has an upwardly directed extension 261. In this extension there is a slot 262. The bottom of this slot is adapted to serve as a stop for the stop pin 263 threaded into the arm 240. Accordingly with the cam 188 removed, the follower structure illustrated in Fig. 11 is brought to a definite position with respect to the carriage 135—136 by springs 252 and 253.

There will now be described the transmission of motion to the cam carrying shaft structure 142—143. This may be best set forth in connection with Figs. 3, 7, 21, 23 and 24.

The shaft extension 203 formed integrally with the shaft 143 passes through the right hand end wall 264 of the casing member 78. At its right hand end this shaft extension 203 carries a clutching arm 265 as by being keyed thereto (Figs. 7, 21 and 23). This clutching arm is arranged to be placed in rotary driving connection with a sleeve 266. This sleeve extends into housing 78. It may be provided with anti-friction bearings 351 interposed in hub 352 formed on the wall 264. Sleeve 266 has a running fit with relation to the shaft extension 203. The manner in which the coupling between sleeve 266 and arm 265 is effected will now be described.

The arm 265 is provided with a guiding aperture 267 (Figs. 21, 23 and 24) having an axis parallel to the axis of shaft extension 203 and spaced therefrom. Operating in this guiding aperture is a plunger 268 having an enlarged portion 269 that is guided in the aperture 267. This plunger 268 carries a manually operable knurled head 270 by the aid of which the plunger structure may be retracted against the force of a compression spring 271. This compression spring operates against the right hand side of the enlarged portion 269 and against a shoulder 272 formed at the right hand end of the guiding aperture 267.

The left hand end of the plunger 268 can be urged into any one of a number of apertures 273 to 280 inclusive. These apertures are disposed uniformly in an annular manner in a disk or index plate 281 that is keyed to the sleeve 266, and is placed adjacent the left hand side of arm 265. Sleeve 266 is arranged to be driven by the aid of the sprocket wheel 282 (Figs. 3 and 7) connected as by a sprocket chain 283 to a sprocket wheel 284 mounted on shaft 75. This shaft 75 as heretofore explained receives its power from the motor driven shaft 57 through the sprocket chain 73 and sprocket wheel 74. Since the shaft 75 operates through the bevel gears 81, 82 (Fig. 7) for imparting rotation to the tire 1, the rotation of the cam 188 through shaft extension 203 is thus operated in synchronism with the tire, and in the same direction. The number of times sleeve 266 is thus rotated for each revolution of tire 1 is made an integer, so as to provide equal angular spacings between the notches formed in the tire. By appropriate gearing ratio changes, this integer may be made to agree with the desired number of notches or other designs to be formed around the entire tread periphery.

Figure 30:
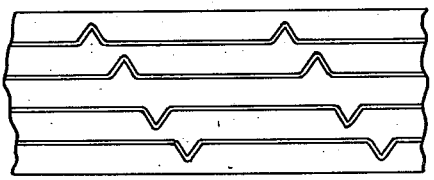

By providing the equally spaced apertures 273 and 280 inclusive, it is possible by appropriate manipulation of the plunger structure 268, etc. to determine the angular position of the notches 186, 187 (Fig. 30) along the tire. Thus it is possible, for each succeeding groove, to move the clutching arm 265 with relation to the driving disk 281 so as to cause an off-set relation of the notches, for example, as illustrated in Fig. 30. Different arrangements may be obtained in this manner. In Fig. 29 for example, the notches in the two grooves 181 and 182 are in alinement, but these notches are angularly spaced from the alined notches 187 in the two grooves 182 and 185. This angular spacing is effected by placing plunger 268 in different apertures in disc 281, for the two groups of grooves.

Figure 31:
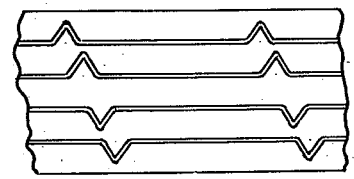

In the tire tread illustrated in Fig. 31, the notches are again somewhat differently spaced. In this case the angular off-set between the notches in consecutive grooves is made less than that illustrated in Fig. 30.

In order to assist in the setting of the clutching arm 265 this clutching arm may be provided as illustrated in Fig. 21 with a pointer 285 adapted to point to any one of a number of numerals 1 to 8 inclusive, corresponding to the apertures 273 to 280, and marked upon the right hand face of the driving disk 281.

Figure 33:
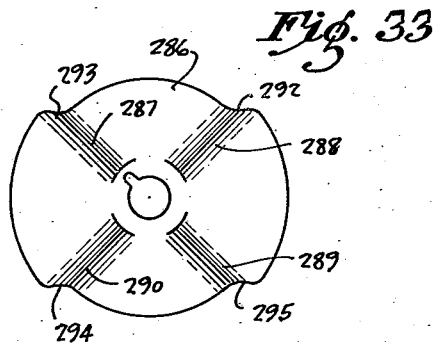
Fig. 33 is a side elevation of a cam of different form from that illustrated in Figs. 26 and 27.
Figure 34:
Fig. 34 is a fragmentary development of a portion of a tire grooved by the aid of the cam shown in Figs. 33 and 35.
Figure 35:
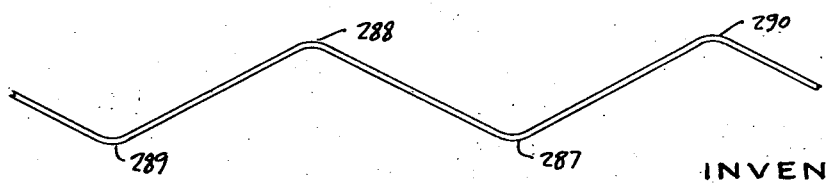
Fig. 35 is a diagrammatic development of the cam illustrated in Fig. 33.

As a further example, a cam of a somewhat different form is illustrated in Figs. 33 and 35. The resultant groove in the tire tread is shown in Fig. 34. In this case the cam 286 is shown as provided with four crown cam portions 287 to 290 inclusive. As shown in the development of Fig. 35, these crown portions are in reverse relation, forming a zig-zag configuration. These crown portions provide for the cutting of the zig-zag groove 291 of Fig. 34. The change in direction of the groover knife structure about the axis of sleeve 90 is accomplished by the radial cam portions 292 to 295 inclusive. In this way the knife directions are maintained properly in relation to the relative direction of travel of the groover knife and the tire.

It is possible to maintain the clutching arm 265 out of clutching relation with driving disk 281, as for example when a straight groove is to be cut. For this purpose the head 270 as illustrated most clearly in Fig. 24 may be provided with a pin 296. The axis of this pin is parallel to the axis of the plunger structure but spaced therefrom. In the driving position of Fig. 24 this pin is accommodated in an appropriate deep recess in the clutching arm 265, thereby permitting movement of the plunger 268 into engagement with one of the apertures in the driving disk 281. By retracting the plunger 268 this pin 296 may be clear of the aperture and a half turn will bring it in position to be engaged in a shallow recess 297 formed in the arm 265. In this position the pin 296 maintains the plunger 268 completely out of any aperture. Such a position therefore permits the shaft extension 203 to remain stationary.

Figure 32:
Fig. 32 is a sectional view of a tire taken in a plane passing through a groove and illustrating a sub-vent.

It is sometimes desirable to provide subvents in the groove and uniformly spaced. Such a subvent 298 illustrated in Fig. 32 is in the form of a low ridge extending transversely of the tire groove 299. These sub-vents serve to reinforce the tire ribs.

The sub-vent in the present instance is conveniently formed by an upward axial movement of the groover knife structure. This upward movement may be accomplished periodically in a manner to be now described.

The sleeve 90 as illustrated most clearly in Figs. 13, 14 and 16, carries the collar 175 heretofore mentioned as a stop collar for limiting downward movement of the groover knife structure within the supporting frame 112. The collar is provided with a slot 300. In this slot is engaged a lifting pin 301. This pin is also indicated in Fig. 15. When the pin 301 is elevated and retracted, a sub-vent such as illustrated in Fig. 32 is formed.

For lifting the pin 301, use is made of a lever 302 located between the upper and lower supporting arms 113 and 115 of the frame 112. This lever 302 is pivoted upon a pin 303 supported in the frame 112, as illustrated in Fig. 14. In order to rotate the lever 302 in a counterclockwise direction as viewed in Fig. 15, this lever has a slot 304 across which extends a pin 305. Attached to this pin 305 is a flexible cable 306 (Fig. 15). This cable is located in a guiding flexible sleeve 307 (Figs. 1, 9, 22, 23 and 25). One end of this flexible guiding sleeve 307 is affixed to a support 308 (Fig. 15) attached to the upper guiding arm 113 of frame 112. The other end of the flexible sleeve 307 is supported in the manner illustrated in Figs. 7, 22, 23 and 25. Thus there is a supporting hook 309 extending over the top of the housing 78 and encompassing the sleeve 307. This hook 309 may be attached to the housing 308 as by the aid of the screws 310.

The lever 302 is given its reciprocal movement in the manner best disclosed in Figs. 21, 22, 23 and 24. For this purpose the cable 306 is shown as fixed in the upper end of a cam follower arm 311. For example, this may be accomplished by the aid of the block 312 fastened to the upper end of the arm 311 through which the cable 306 passes. A set screw 313 serves to fasten the cable in the block.

The cam follower arm 311 is shown as pivotally supported adjacent its lower end upon a pivot screw 314 (Figs. 22 and 23) which is attached to the right hand wall 264 of the housing 78.

At an intermediate portion of the arm 311 is a cam follower roller 315. This roller is rotatably supported by the aid of a ball bearing structure 316 supported upon the stud 317 affixed to the arm 311.

The cam follower roller 316 cooperates with a cam 318. This cam is coaxial with the shaft extension 203 and is shown as formed integrally with a disk 319. The manner in which this disk 319 is driven will be described hereinafter.

The cam 318 has a flat portion 320. Opposite this flat portion is a bar 321 attached to the disk 319. The bar 321 and the flat portion 320 define a groove 322 which is just wide enough to admit the cam follower roller 315. As the cam disk 319 rotates the cam follower roller will be urged into the groove 322 and the cable 306 will be given a motion toward the left as viewed in Fig. 22. This motion toward the left occurs for each revolution of the disk 319 and causes the lever 302 of Fig. 15 to rotate in a counterclockwise direction. This operation causes a lifting of the groover knife structure. As soon as the roller 315 passes out of the groove 322, cable 306 is urged toward the right and the groover knife is restored to normal position.

By appropriate configuration of the cam elements, the number and size of the sub-vents may be controlled.

The disk 319 which carries the cam structure is provided with a plunger receiving recess 323 shown most clearly in Figs. 21 and 23. Within this recess is adapted to be accommodated the end 324 of a plunger structure 325 in the upper end of clutching arm 265. This plunger structure 325 is similar to the plunger structure described in connection with the clutching arm 265 for clutching the driving disk 281 to the shaft extension 203. It is also similarly arranged to be optionally engaged or disengaged from the aperture 323. When it is desired to operate the cam disk 319 for forming the sub-vents, the plunger 324 is placed in driving relation with the aperture 323.

To operate both of the plunger structures carried by the clutching arm 265, first the plunger structure 325 is rendered operative and then the cam disk 319 is moved around until the desired aperture in the series 273 to 280 inclusive is in alinement with the plunger 269, and then plunger 268 is allowed to enter the aperture. The cam disk 319 is provided with a central recess for the accommodation of the driving disk 281, as illustrated most clearly in Fig. 23.

Should it be desired to provide sub-vents in a straight groove, provisions must be made for driving the cam disk 319 even when the shaft extension 203 is not driven. Under such circumstances the plunger 268 is pulled out of operative engagement with the driving disk 281. The driving disk 281 nevertheless is optionally caused to be coupled to the cam disk 319 by the aid of a ratchet 326. This ratchet 326 is pivotally mounted upon a pivot screw 327 supported upon the cam disk 319. This cam disk is cut away as illustrated by the walls 328 and 329 of Fig. 21, in order to form a space accommodating pawl 326.

The pawl 326 is adapted to cooperate with the notch 330 formed in the periphery of the driving disk 281. The active position of the pawl is illustrated in dot and dash lines in Fig. 21. Thus when the plunger 268 is out of engagement with the driving disk 281, the driving disk in rotating in a counter-clockwise direction as viewed in Fig. 21 will ultimately engage the pawl 326 and will thereby drive the cam disk 319.

Means are provided for rendering this pawl 326 inactive. For this purpose the hub of pawl 326 is provided with the serrations 331 (Fig. 21). With these serrations there cooperates a restraining pin 332. For this purpose this pin 332 is provided with a tapered extremity. It is guided in a long recess 333 formed in the wall 327. The restraining pin 332 is urged into engagement with the serrations 331 as by the aid of the compression spring 334. If it is desired to render the pawl 326 inactive, the pawl 326 is rotated manually in a counterclockwise direction so that its engaging end is out of the path of the notch 330. This position is shown in full lines in Fig. 21.

If neither sub-vents nor notches are to be cut, pawl 326 as well as plungers 268 and 324 are placed in the inactive position. When both sub-vents and notches are to be cut, the pawl 326 is inactive, but both plungers 268 and 324 are in active position. If only sub-vents are to be cut, both plungers are out, but pawl 326 is moved into active position. If only notches are to be cut, pawl 326 and plunger 324 are inactive, while plunger 268 is active.

The manner of operation of the device may now be summarized.

It is assumed that the power is on, and the tire 1 is rotated. Carriage 135—136 is lifted away from the tire, and an appropriate groover knife 4 is inserted in the groover knife structure apparatus and clamped in place by the clamping screw 104 (Fig. 17). If no deviations from a straight groove are desired, plunger 268 is disengaged from the driving disk 281 so that the shaft structure 142—143 is disconnected from the driving means, and cam 188 is then placed in neutral position as previously described. The axis 2 of the tire 1 is adjusted so that the outer periphery of the tire is in engagement with the freely rotatable stitcher roller 14. This stitcher roller 14 as shown most clearly in Fig. 2 is out of clutching engagement with the motor driven shaft 57. The knife structure is moved to the appropriate central groove position by the aid of the hand wheel 150. The carriage structure 135—136 can then be moved downwardly by the aid of the handle 138.

Switch 110 is now operated, and the groove is formed by depressing the carriage structure 135—136 to render the groover knife 4 operative.

Successive grooves are cut by the adjustment of the groover knife structure on either side of the center, and as determined by the chart 160 and the cooperating index member 159. For cutting these straight grooves without sub-vents the plunger 268 (Fig. 23) is maintained out of operative relation with the driving disk 281. If sub-vents are nevertheless desired, plunger 324 is also maintained out of operative relation with the cam disk 319 and the pawl 326 is placed in operative relation with the disk 281.

For providing notches or other deviations from a straight groove, an appropriate cam is placed between the shaft sections 142 and 143, and the clutch arm 274 is moved into engaging position with any desired aperture 273 to 280 inclusive. If sub-vents are desired to be cut, the plunger structure 324 is also placed in operative driving relation with the cam disk 319. In this position the pawl 326 is in the inactive full line position of Fig. 21.

For succeeding grooves, the angular relation between the clutch arm 265 and the driving disk 281 may be altered, to provide optionally the offset relationship between succeeding grooves. For cutting diagonal portions of the grooves in opposite directions, appropriate cam changes must be made.

What is claimed is:

1. In a tire groover apparatus, a groover knife structure, and means for adusting the structure laterally of the tire face, as well as for adjusting it angularly so that the adjustment takes place in a direction transverse to the face of the tire, comprising a pivot support for the structure, a member connected to the structure at a distance spaced from the axis of the said pivot support, and means for laterally adjusting the axis of said pivot support and for laterally adjusting said member, said means comprising a differential screw mechanism.

2. In a tire groover mechanism, means for rotating a tire about its axis, a groover knife structure, a mechanism operating in synchronism with the tire rotation, for moving said structure intermittently laterally to cause the structure to have relative movement oblique to the groove being cut, and means for causing the knife to present the cutting edge in the direction of said relative movement.

3. In a tire groover mechanism, means for rotating a tire about its axis, a groover knife structure, a mechanism operating in synchronism with the tire rotation, for moving said structure intermittently laterally to cause the structure to have relative movement oblique to the groove being cut, and means for adjusting said mechanism for determining the angular relationship of the oblique movement to the angular position of the tire about its axis.

4. In a tire groover mechanism, means for rotating a tire about its axis, a groover knife structure, a shaft parallel to the axis of the tire, a stitcher roller supported thereon, a common source of power for the shaft and for the tire rotating means, means for adjusting the spacing of the shaft axis and the tire axis, and means for optionally power rotating said shaft.

5. In a tire groover mechanism, means for rotating a tire on its axis, a carriage, a groover knife structure supported on the carriage, cam means, operating in synchronism with the tire rotation. for periodically moving said structure to reduce the depth of the groove, and means for optionally rendering said cam means inactive.

6. In a tire groover mechanism, a carriage, a groover knife structure supported on the carriage, means for adjusting the structure with respect to the carriage, and in the direction of the tire axis, and a scale and pointer mechanism for facilitating said adjustment, comprising a drum carried by the carriage, a chart on the drum, means for adjusting the drum about its axis, and a pointer carried by the groover knife structure cooperating with the chart.

7. In a tire groover, the combination of means for rotating a tire about its axis, a groover knife structure, cam means including two separated cam surfaces, a cam follower for each said cam surface, means operatively connecting one of said followers with the knife structure to abruptly shift the position of the knife transversely of the tire surface during rotation of the tire, means operatively connecting the other of said followers with the knife structure to rotate the knife structure to maintain the cutting edge of the knife in the same cutting relation with the tire surface during the abrupt change of path of the knife on the tire surface, and means for driving the cam means in timed relation with the rotation of the tire.

8. In a tire groover, the combination of means for rotating a tire about its axis, a groover knife structure, a rotating cam member having a cam surface extending in a radial direction from the center of rotation, a cam follower, the radially extending cam surface of the cam member providing a varying cam arm through its radial extent, means for adjusting the position of the cam follower radially with respect to the axis of rotation of the cam whereby the cam follower is differently moved under the action of the said cam surface at points of different adjustment, means operatively connecting the cam follower with the knife structure to abruptly shift the position of the knife structure transversely of the tire surface during rotation of the tire, means for driving the cam member in timed relation with the rotation of the tire.

9. In a tire groover, the combination of means for rotating a tire about its axis, a groover knife structure, a cam means including two separated cam surfaces, a cam follower for each said cam surface, means operatively connecting one of the cam followers with the knife structure to abruptly shift the position of the knife transversely of the tire surface during rotation of the tire, means operatively connecting the other of said followers with the knife structure to rotate the knife structure to maintain the same cutting relation between the edge of the knife and the tire during the abrupt change of the knife on the tire surface, means for driving the cam means in timed relation with the tire, and means for rocking the knife structure to maintain the knife structure substantially tangent to the curved tire surface during rotation of the tire.

10. In a tire groover, the combination of means for rotating a tire about its axis, a groover knife structure, a cam means operatively connected with the knife structure to abruptly shift the knife structure transversely of the tire surface during rotation of the tire, means operative to rotate the knife structure during the abrupt shifting thereof to maintain a proper cutting relationship between the knife structure and the tire surface, and means operative to rock the knife structure to maintain the cutting knife substantially tangent to the curvature of the tire surface.

11. In a tire groover, the combination of means for rotating a tire about its axis, a groover knife structure including a knife member adapted to cut a groove in the tread of the tire as it is rotating, cam means including two spaced cam surfaces, a cam follower for each said cam surface, means operatively connecting one of the cam followers with the knife structure to move the knife structure laterally with respect to the rotating tire surface, means operatively connecting the other of said followers with the knife to rotate the knife during lateral shifting of the knife structure, and means for driving the cam means in timed relation with the rotation of the knife.

12. In a tire groover, the combination of means for rotating a tire about its axis, a groover knife structure, a groover knife carried by the knife structure, cam means including spaced cam surfaces, follower means adapted to contact the spaced cam surfaces, means operatively connecting the follower means with the knife structure to shift the same laterally with respect to the moving tire surface, means operatively connecting the other follower means with the knife to rotate the knife during the lateral shifting thereof, and means operatively connected with the knife structure for rocking the knife to maintain the knife substantially tangent to the tire surface during its cutting action.

ELBERT LITTON BIVANS.